US009113012B2

(12) United States Patent
Ozawa et al.

(10) Patent No.: US 9,113,012 B2
(45) Date of Patent: Aug. 18, 2015

(54) IMAGE FORMING SYSTEM INCLUDING IMAGE FORMING APPARATUS REMOTELY OPERATED BY PORTABLE INFORMATION DEVICE, AND COOPERATION METHOD

(71) Applicant: Konica Minolta, Inc., Chiyoda-ku (JP)

(72) Inventors: Kaitaku Ozawa, Nishinomiya (JP); Shoji Imaizumi, Shinshiro (JP); Hiroaki Kubo, Muko (JP); Takeshi Minami, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 4 days.

(21) Appl. No.: 13/961,396

(22) Filed: Aug. 7, 2013

(65) Prior Publication Data
US 2014/0043635 A1 Feb. 13, 2014

(30) Foreign Application Priority Data

Aug. 9, 2012 (JP) .................................. 2012-176876

(51) Int. Cl.
H04N 5/225 (2006.01)
G06F 3/12 (2006.01)
H04N 1/00 (2006.01)
H04N 1/32 (2006.01)

(52) U.S. Cl.
CPC ....... *H04N 1/00307* (2013.01); *H04N 1/32122* (2013.01); *H04N 2201/0075* (2013.01); *H04N 2201/0094* (2013.01)

(58) Field of Classification Search
CPC ............................. H04N 1/00; H04N 1/00307
USPC ....................................... 358/1.15; 347/207.2
See application file for complete search history.

(56) References Cited

U.S. PATENT DOCUMENTS

2008/0231890 A1 9/2008 Kishi
2011/0007901 A1* 1/2011 Ikeda et al. ................... 380/270

FOREIGN PATENT DOCUMENTS

| JP | 2006-067339 A | 3/2006 |
| JP | 2008-219351 A | 9/2008 |
| JP | 2008-228036 A | 9/2008 |

OTHER PUBLICATIONS

Yamada Masasane, Image formation system and Image forming apparatus, Sep. 18, 2008, JP 2008-219351, English Translation.*
Notice of Ground of Rejection issued in corresponding Japanese patent Application No. 2012-176876, mailed Jul. 22, 2014, and English translation.

* cited by examiner

*Primary Examiner* — Fred Guillermety
(74) *Attorney, Agent, or Firm* — Buchanan Ingersoll & Rooney PC

(57) ABSTRACT

A portable information device includes a shooting portion to shoot a subject, and a notice portion to notify an image forming apparatus that an image is shot, in response to an operation screen of the image forming apparatus being shot. The image forming apparatus includes a display control portion to display an operation screen, a data decision portion to decide related data related to an operation screen displayed at a point of time when the notice is received, from among data held by the image forming apparatus at that point of time, and a related data transmission portion to transmit the related data to the portable information device. The portable information device further includes a related data reception portion to receive the related data from the image forming apparatus and a related data storage portion to store the related data.

13 Claims, 12 Drawing Sheets

F I G. 2
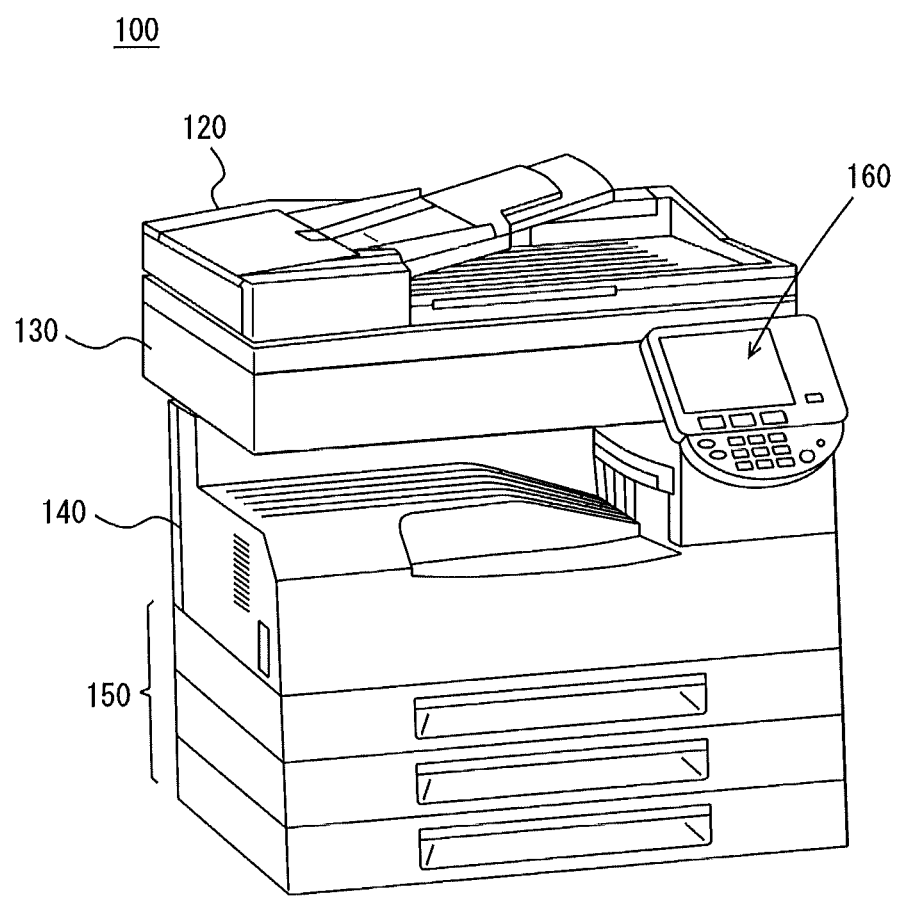

IMAGE FORMING SYSTEM INCLUDING IMAGE FORMING APPARATUS REMOTELY OPERATED BY PORTABLE INFORMATION DEVICE, AND COOPERATION METHOD

This application is based on Japanese Patent Application No. 2012-176876 filed with Japan Patent Office on Aug. 9, 2012, the entire content of which is hereby incorporated by reference.

BACKGROUND OF THE INVENTION

1. Field of the Invention

The present invention relates to an image forming system and a cooperation method, and more particularly to an image forming system including an image forming apparatus remotely operated by a portable information device and a cooperation method performed in the image forming system.

2. Description of the Related Art

In recent years, the functions of Multi-Functional Peripherals (MFPs) have become increasingly complex and involve wide-ranging conditions for executing processes, which often makes the operation of setting the conditions complicated. Meanwhile, portable information devices in recent years have been sophisticated and increased in variety to meet personal needs. Portable information devices carried by individuals are used relatively more frequently than MFPs, so that users can learn the operation procedures thereof even though they are complicated. For this reason, techniques for remotely operating an MFP with a portable information devices have been developed.

Japanese Patent Laid-Open No. 2008-228036 discloses an image processing system including a mobile phone and an image processing apparatus, in which the mobile phone executes a function setting information input program to display an input screen for the image processing apparatus to perform function settings. When the user inputs function setting information, a code image generated by converting the input function setting information is displayed on a display unit. When the user holds the code image displayed on the mobile phone over a scan unit of the image processing apparatus, the image processing apparatus scans the code image, performs user authentication, and then extracts the function setting information from the code image for image processing in accordance with the function setting information.

In the conventional image processing system, however, a dedicated function setting information input program corresponding to the image processing apparatus has to be installed in the mobile phone. For example, when the functions of the image processing apparatus are expanded, or when an image processing apparatus having different functions is used, a function setting information input program adapted thereto has to be installed. Accordingly, the mobile phone is dependent on the functions of the image processing apparatus that it cooperates with.

SUMMARY OF THE INVENTION

In accordance with an aspect of the present invention, an image forming system is configured with an image forming apparatus and a portable information device capable of communicating with the image forming apparatus. The portable information device includes a shooting portion to shoot an image of a subject and a notice portion to give a notice that an image is shot to the image forming apparatus, in response to an image of an operation screen of the image forming apparatus being shot. The image forming apparatus includes a display control portion to display an operation screen, a data decision portion to, in response to the notice being received from the portable information device, decide related data that is related to the operation screen displayed at a point of time when the notice is received, from among data held by the image forming apparatus at that point of time, and a related data transmission portion to transmit the decided related data to the portable information device. The portable information device further includes a related data reception portion to receive the related data from the image forming apparatus in response to the notice and a related data storage portion to store the received related data.

In accordance with another aspect of the present invention, a cooperation method is executed in an image forming system configured with an image forming apparatus and a portable information device capable of communicating with the image forming apparatus. The portable information device includes a shooting portion to shoot an image of a subject. The method allows the portable information device to execute a notice step of giving a notice that an image is shot to the image forming apparatus, in response to an image of an operation screen of the image forming apparatus being shot by the shooting portion. The method allows the image forming apparatus to execute: a display control step of displaying an operation screen; a data decision step of, in response to the notice being received from the portable information device, deciding related data that is related to the operation screen displayed at a point of time when the notice is received, from among data held by the image forming apparatus at that point of time; and a related data transmission step of transmitting the decided related data to the portable information device. The method further allows the portable information device to execute: a related data reception step of receiving the related data from the image forming apparatus in response to the notice; and a related data storage step of storing the received related data.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is an external perspective view of an MFP.

DESCRIPTION OF THE PREFERRED EMBODIMENTS

Figure 1:
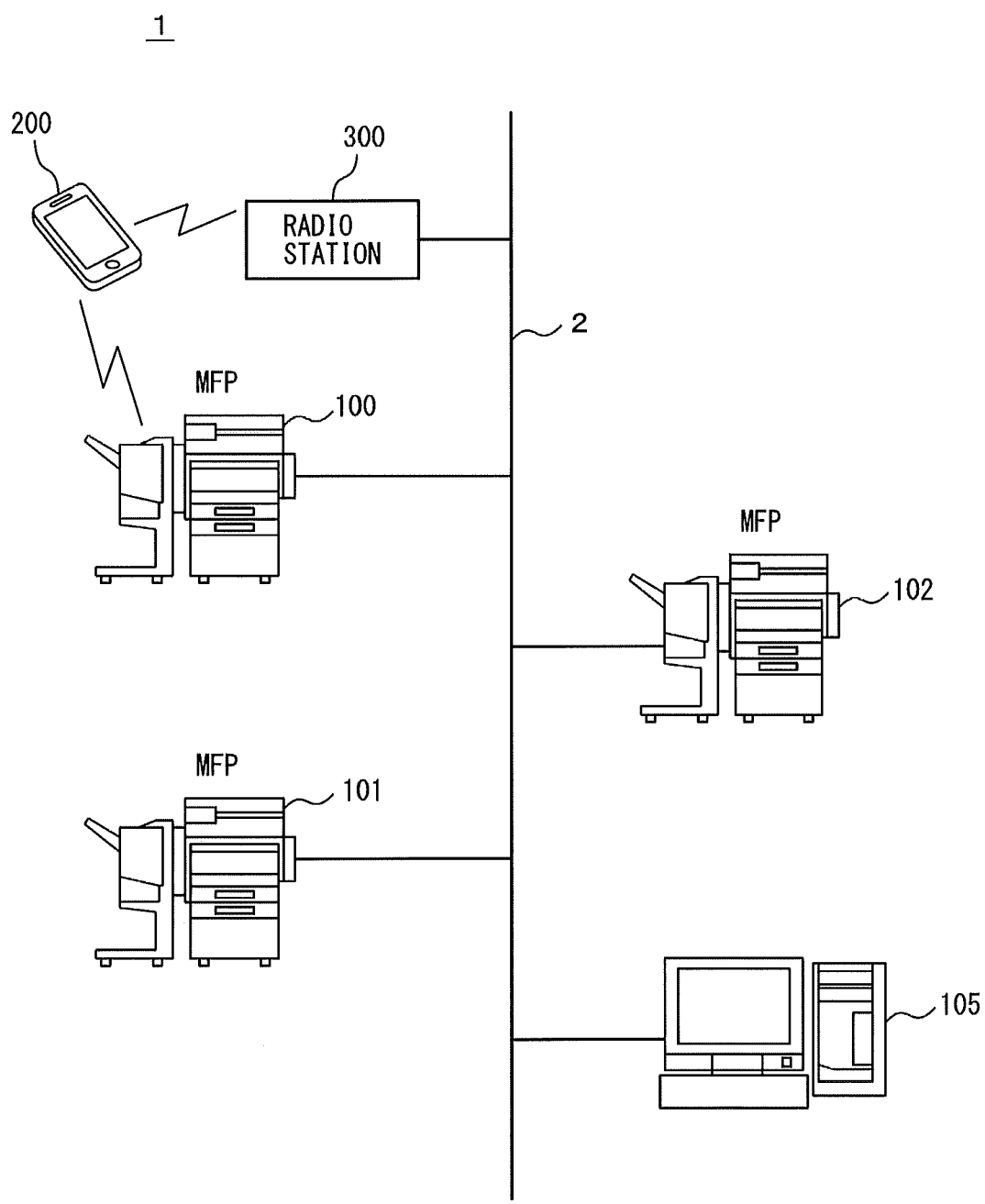
FIG. 1 is a diagram showing an overview of an image forming system in an embodiment of the present invention.

Embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a diagram showing an overview of an image forming system in an embodiment of the present invention. Referring to FIG. 1, an image forming system 1 includes MFPs (Multi-Functional Peripherals) 100, 101, 102 as image forming apparatuses, a personal computer (hereinafter referred to as "PC") 105, a portable information device 200, and a radio station 300, each connected to a network 2.

PC 105 is a general computer and is installed with a printer driver program for controlling MFPs 100, 101, 102. In a case where MFPs 100, 101, 102 are of different kinds, three kinds of printer driver programs for controlling MFPs 100, 101, 102 are installed in PC 105.

MFPs 100, 101, 102 each have a document scanning function for scanning a document, an image forming function of forming an image on a recording medium such as paper based on image data, and a facsimile transmitting/receiving function of transmitting/receiving facsimile data. Although MFPs 100, 101, 102 are illustrated in the present embodiment, MFPs 100, 101, 102 may be replaced by any other devices having the function of forming an image, such as printers and facsimile machines. MFPs 100, 101, 102 have the same functions and, therefore, MFP 100 will be described as an example below unless otherwise specified.

Portable information device 200 is a general mobile phone and can make a call by wirelessly communicating with a mobile phone base station to connect to a mobile phone network. Portable information device 200 has a wireless LAN function.

Network 2 is a Local Area Network (LAN), either wired or wireless. Network 2 is not limited to a LAN and may be a network such as a Public Switched Telephone Network. Network 2 is further connected to a Wide Area Network (WAN) such as the Internet.

Radio station 300 is a relay apparatus of network 2 that communicates with portable information device 200 having a wireless LAN communication function to connect portable information device 200 to network 2. MFPs 100, 101, 102 are each able to transmit/receive data to/from PC 105 through network 2. MFPs 100, 101, 102 each can transmit/receive data with portable information device 200 through network 2 and radio station 300.

Figure 3:
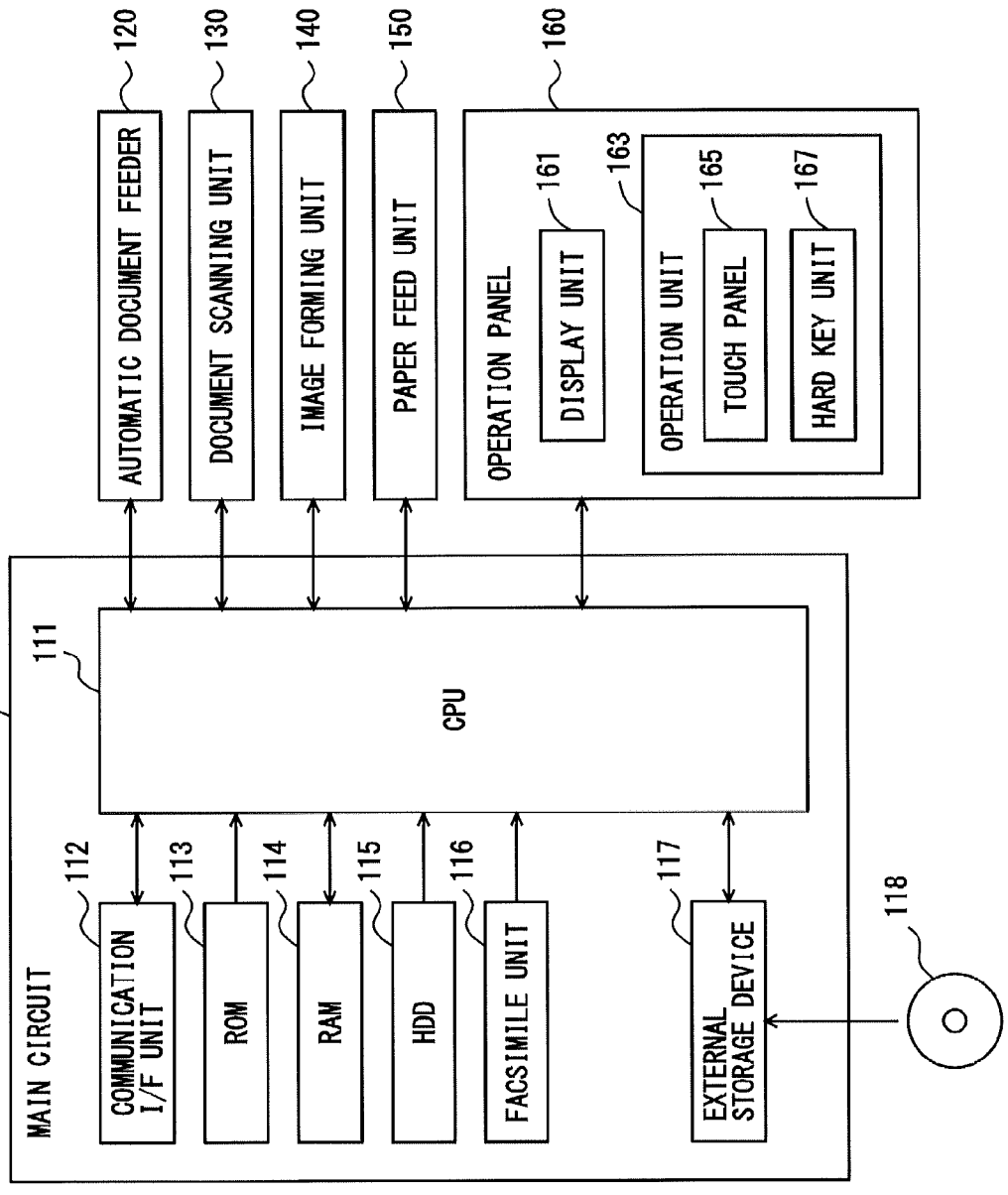
FIG. 3 is a block diagram showing an overall hardware configuration of the MFP.

FIG. 2 is an external perspective view of an MFP. FIG. 3 is a block diagram showing an overall hardware configuration of the MFP. Referring to FIGS. 2 and 3, MFP 100 includes a main circuit 110, a document scanning unit 130 for scanning a document, an automatic document feeder 120 for conveying a document to document scanning unit 130, an image forming unit 140 for forming an image on a sheet of paper based on image data output by document scanning unit 130 scanning a document, a paper feed unit 150 for supplying paper to image forming unit 140, and an operation panel 160 serving as a user interface.

Main circuit 110 includes a CPU 111, a communication interface (I/F) unit 112, a ROM 113, a RAM 114, an HDD (Hard Disk Drive) 115 serving as a mass storage device, a facsimile unit 116, and an external storage device 117 to which a CD-ROM 118 is attached. CPU 111 is connected to automatic document feeder 120, document scanning unit 130, image forming unit 140, paper feed unit 150, and operation panel 160 to control the entire MFP 100.

ROM 113 stores a program executed by CPU 111 or data necessary to execute the program. RAM 114 is used as a working area for CPU 111 to execute a program. RAM 114 temporarily stores scan data (image data) successively sent from document scanning unit 130.

Operation panel 160 is provided on the upper surface of MFP 100 and includes a display unit 161 and an operation unit 163. Display unit 161 is a display such as an LCD (Liquid Crystal Display) or an organic ELD (Electroluminescence Display) for displaying instruction menus to users, information about the acquired image data, and the like. Operation unit 163 includes a plurality of keys for accepting input of a variety of instructions and data such as characters and numerals through user's operation corresponding to the keys. Operation unit 163 further includes a touch panel provided on display unit 161.

Communication I/F unit 112 is an interface for connecting MFP 100 to network 2. CPU 111 communicates with MFP 101, 102, PC 105, or portable information device 200 through communication I/F 112 to transmit/receive data. Communication I/F unit 112 can also communicate with a computer connected to the Internet via network 2.

Facsimile unit 116 is connected to a PSTN (Public Switched Telephone Network) to transmit facsimile data to the PSTN or receive facsimile data from the PSTN. Facsimile unit 116 stores the received facsimile data into HDD 115 or outputs the received facsimile data to image forming unit 140. Image forming unit 140 prints the facsimile data received by facsimile unit 116 on a sheet of paper. Facsimile unit 116 also converts data stored in HDD 115 into facsimile data and transmits the facsimile data to a facsimile machine connected to the PSTN.

CD-ROM 118 is attached to external storage device 117. CPU 111 can access CD-ROM 118 through external storage device 117. CPU 111 loads the program stored in CD-ROM 118 attached to external storage device 17 into RAM 114 for execution. A medium encoded with a program executed by CPU 111 is not limited to CD-ROM 118 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

The program executed by CPU 111 is not limited to a program stored in CD-ROM 118, and a program stored in HDD 115 may be loaded into RAM 114 for execution. In this case, another computer connected to network 3 may overwrite the program stored in HDD 115 of MFP 100 or additionally write a new program. MFP 100 may download a program from another computer connected to network 2 and store the program into HDD 115. The program referred to here includes not only a program directly executable by CPU 111 but also a source program, a compressed program, an encrypted program, and the like.

In image forming system 1 in the present embodiment, data is transmitted/received between MFPs 100, 101, 102 and portable information device 200. Any protocol for transmitting/receiving data can be used as long as the receiver device can specify the sender. The protocol for transmitting/receiving data is, for example, HTTP (Hyper Text Transfer Protocol), FTP (File Transfer Protocol), SMPT (Simple Mail Transfer Protocol), or POP (Post Office Protocol).

Figure 4:
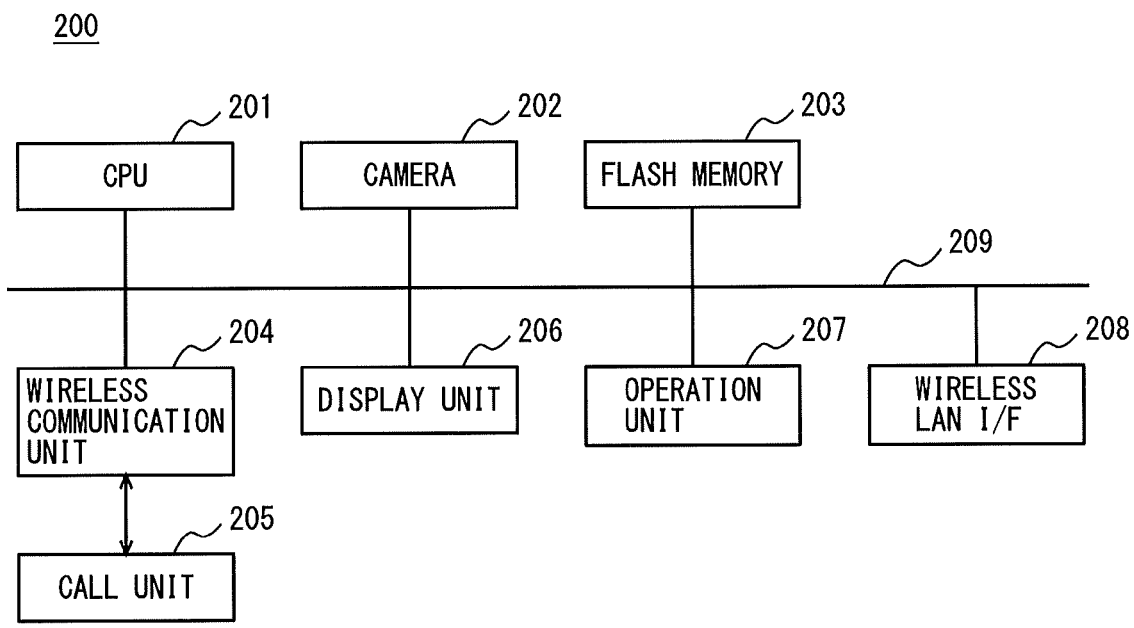
FIG. 4 is a functional block diagram showing an overall hardware configuration of a portable information device.

FIG. 4 is a functional block diagram showing an overall hardware configuration of the portable information device. Referring to FIG. 4, portable information device 200 includes a CPU 201 for controlling the entire portable information device 200, a camera 202, a flash memory 203 storing data in a nonvolatile manner, a radio communication unit 204 connected to a call unit 205, a display unit 206 displaying information, an operation unit 207 accepting user's operation input, and a wireless LAN I/F 208.

Wireless communication unit 204 wirelessly communicates with a mobile phone base station connected to a telephone communication network. Wireless communication unit 204 connects portable information device 200 to the telephone communication network to establish calls using call unit 205. Wireless communication unit 204 decodes a voice signal obtained by demodulating a radio signal received from the mobile phone base station and outputs the decoded signal to call unit 205. Wireless communication unit 204 encodes voice input from call unit 205 and transmits the encoded voice to the mobile phone base station. Call unit 205 includes a microphone and a speaker to output voice input from wireless communication unit 204 from the speaker and output voice input from the microphone to wireless communication unit 204. Wireless communication unit 204 is controlled by CPU 201, and connects portable information device 200 to an email server to transmit/receive emails.

Camera 202 includes a lens and an optoelectronic transducer. Light collected by the lens is imaged at the optoelectronic transducer, which transduces the received light into image data for output to CPU 201. The optoelectronic transducer is, for example, a CMOS (Complementary Metal Oxide Semiconductor) sensor or a CCD (Charge Coupled Device) sensor.

Display unit 206 is a display such as a Liquid Crystal Display (LCD) or an organic ELD and displays instruction menus to the user and information related to the acquired image data. Operation unit 207 includes a plurality of keys and accepts input of various instructions and data such as characters and numerals through user's operation corresponding to the keys.

Wireless LAN I/F 208 is an interface that communicates with radio station 300 for connecting portable information device 200 to network 2. The respective IP addresses of MFPs 100, 101, 102 are registered in advance in portable information device 200 so that portable information device 200 can communicate with MFPs 100, 101, 102 and transmit/receive data. Although portable information device 200 communicates with MFPs 100, 101, 102 using wireless LAN I/F 208 in the present embodiment, by way of example, any other communication method can be used for communication. Specifically, in a case where portable information device 200 and MFPs 100, 101, 102 are each equipped with a short distance radio device such as Bluetooth®, portable information device 200 may communicate one-to-one with any one of MFPs 100, 101, 102. Portable information device 200 may be connected by wire such as a USB (Universal Serial Bus) cable to any one of MFPs 100, 101, 102 so that portable information device 200 communicates one-to-one with any one of MFPs 100, 101, 102.

Flash memory 203 stores a program executed by CPU 201 or data necessary to execute the program. CPU 201 loads the program stored in flash memory 203 into the RAM of CPU 201 for execution. The program executed by CPU 201 may be a program stored in flash memory 203, or another computer connected to network 2 may overwrite the program stored in flash memory 203 or additionally write a new program. Portable information device 200 may download a program from another computer connected to network 2. The program referred to here includes not only a program directly executable by CPU 201 but also a source program, a compressed program, an encrypted program, and the like.

A medium encoded with a program executed by CPU 201 is not limited to flash memory 203 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM, or an EEPROM (Electrically EEPROM).

Figure 5:
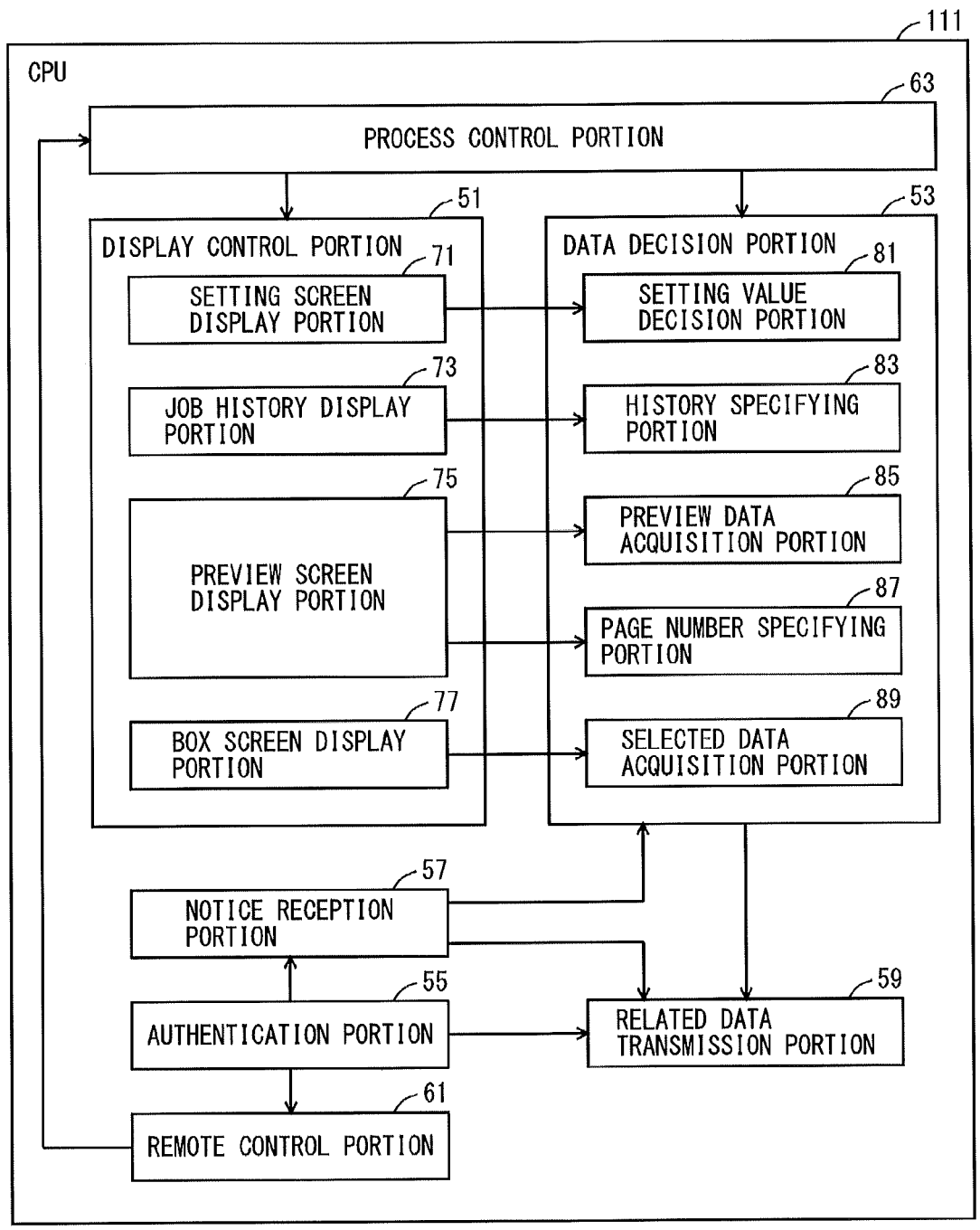
FIG. 5 is a block diagram showing an overview of functions of a CPU of the MFP in the present embodiment.

FIG. 5 is a block diagram showing an overview of functions of the CPU of the MFP in the present embodiment. The functions shown in FIG. 5 are formed in CPU 111 by CPU 111 of MFP 100 executing a remote control program stored in ROM 113, HDD 115 or CD-ROM 118. Referring to FIG. 5, CPU 111 includes a display control portion 51 for controlling display unit 161, an authentication portion 55 authenticating a user, a notice reception portion 57 receiving a shooting notice from portable information device 200, a data decision portion 53 deciding related data, a related data transmission portion 59 transmitting related data to portable information device 200, a remote control portion 61 executing a process in accordance with a remote operation command received from the portable information device, and a process control portion 63.

Process control portion 63 executes a process in accordance with a setting value. The process executed by process control portion 63 includes an image forming process of controlling image forming unit 140 for forming an image, a document scanning process of controlling image scanning unit 130 for scanning a document image, a data transmitting/receiving process of controlling communication I/F unit 112 for transmitting/receiving data, a facsimile transmitting/receiving process of controlling facsimile unit 116 for transmitting/receiving facsimile data, and a data management process of controlling HDD 115 or external storage device 117 for writing or reading data.

In the case where an image forming process is executed, process control portion 63 sets data to be subjected to image forming as a process target. In the case where a document scanning process is executed, process control portion 63 sets data output by document scanning unit 130 scanning a document as a process target. In the case where a data transmitting/receiving process is executed, process control portion 63 sets data transmitted/received by communication I/F unit 112 as a process target. In the case where a facsimile transmitting/receiving process is executed, process control portion 63 sets facsimile data transmitted/received by facsimile unit 116 as a process target. In the case where a data management process is executed, process control portion 63 sets data written into HDD 115 or external storage device 117, or data read from HDD 115 or external storage device 117, as a process target.

Display control portion 51 displays one of a plurality of operation screens stored in HDD 115 on display unit 161. A plurality of operation screens are associated with each other, and one operation screen has a transition button for switching to another operation screen. When operation unit 163 detects operation of designating the transition button, display control portion 51 reads out the operation screen associated with the transition button from EEPROM 115 and displays the read operation screen on display unit 161.

Display control portion 51 includes a setting screen display portion 71, a job history display portion 73, a preview screen display portion 75, and a BOX screen display portion 77. The plurality of operation screens include different kinds of operation screens. Any one of setting screen display portion 71, job history display portion 73, preview screen display portion 75, and BOX screen display portion 77 displays an operation screen on display unit 161.

Setting screen display portion 71 displays a setting-type operation screen among different kinds of operation screens. The setting-type operation screen is an operation screen for setting a setting value for process control portion 63 to execute a process and includes an area for displaying a setting value that is set. Of the operation screens, the setting-type screen is called a setting screen.

When setting screen display portion 71 displays a setting screen on display unit 161, the user can enter a setting value into operation unit 163. With the setting screen appearing on display unit 161, process control portion 63 accepts a setting value input to operation unit 163 and sets the accepted setting value. For example, a setting value can be set by storing a setting value into RAM 114. When a start key of operation unit 163 is designated, process control portion 63 executes a process in accordance with the set setting value.

Job history display portion 73 displays a history-type operation screen among different kinds of operation screens. The history-type operation screen is an operation screen for displaying history information and includes an area for displaying history information stored by process control portion 63. Of the operation screens, the history-type operation screen is called a job history screen. Process control portion 63 executes a process and stores history information showing the result of executing the process into HDD 115, so that job history display portion 73 reads out the history information stored in HDD 115 and displays a job history screen on display control portion 161.

History information includes job identification information for identifying a job which is a unit of a process executed by process control portion 63, a date and time when the job is executed, process identification information for identifying a process, and a setting value set when the process is executed. For example, if the job is a facsimile transmitting process of transmitting facsimile, the history information includes job identification information assigned to the facsimile transmitting process, the date and time when the facsimile transmitting process is executed, process identification information "Facsimile Transmission" for identifying the facsimile transmitting process, the facsimile number of the destination to which facsimile data is transmitted, as a setting value set for the facsimile transmitting process, and data identification information for identifying facsimile data.

Preview screen display portion 75 displays a preview-type operation screen among different kinds of operation screens. The preview-type operation screen is an operation screen for displaying an image of data set as a process target by process control portion 63 and includes an area for displaying an image of data set as a process target by process control portion 63. Of the operation screens, the preview-type operation screen is called a preview screen. Data corresponding to an image included in the preview screen includes data output by document scanning unit 130 scanning a document and data read out from HDD 115 or external storage device 117, among data set as process targets by process control portion 63.

BOX screen display portion 77 displays a BOX-type operation screen among different kinds of operation screens. The BOX-type operation screen is an operation screen for accepting designation of data set as a process target by process control portion 63 and includes an area for displaying a list of data stored in HDD 115. Of the operation screens, the BOX-type operation screen is called a BOX screen. The area for displaying a list of data includes data identification information for identifying data.

Authentication portion 55 transmits a login screen to portable information device 200 when communication I/F unit 112 establishes connection with portable information device 200 and receives a login request from portable information device 200. The login screen includes an area for inputting user identification information for identifying a user and an area for inputting authentication information. Authentication portion 55 receives the user identification information and authentication information from portable information device 200 that the login screen is transmitted to, and authenticates the user who operates portable information device 200. MFP 100 has user data including user identification information for identifying users and authentication information stored in HDD 115. Authentication portion 55 compares the user identification information and authentication information received from portable information device 200 with the user data stored in HDD 115. If they agree, authentication portion 55 determines that authentication is successful, and permits login. If they do not agree, authentication portion 55 determines that authentication is failed, and does not permit login. Authentication portion 55 returns a permission signal if login is permitted, and returns a non-permission signal if login is not permitted.

Authentication portion 55 acquires device identification information of portable information device 200 when connection is established with portable information device 200. The identification information of portable information device 200 is, for example, location information on network 2 allocated to portable information device 200. The location information on network 2 is, for example, an IP (Internet Protocol) address or a MAC (Media Access Control) address. If authentication is successful, authentication portion 55 outputs a set of the user identification information for identifying the user who operates the authenticated portable information device 200 and the device identification information of portable information device 200 to notice reception portion 57, related data transmission portion 59, and remote control portion 61.

In the present embodiment, a password is used as authentication information, by way of example. Biometric information such as fingerprints, vein patterns, and irises of users may be used for authentication. In this case, portable information device 200 includes a reader for reading biometric information.

Notice reception portion 57 receives a set of the user identification information of the user and the device identification information of portable information device 200 from authentication portion 55 and thereafter receives a shooting notice transmitted from portable information device 200 specified by the device identification information. When communication I/F unit 112 receives a shooting notice, notice reception portion 57 acquires the device identification information of the device that has transmitted the shooting notice and compares the acquired device identification information with the device identification information input from authentication portion 55. If the device identification information of the device that has transmitted the shooting notice is the same as the device identification information input from authentication portion 55, notice reception portion 57 acquires the shooting notice received by communication I/F unit 112. If they are different, notice reception portion 57 discards the shooting notice received by communication I/F unit 112. Accordingly, a shooting notice can be received only when the user authenticated by authentication portion 55 operates portable information device 200.

The shooting notice is a signal transmitted by portable information terminal 200 described later to MFP 100 when camera 202 shoots an image of an operation screen appearing on display unit 161 of MFP 100. Portable information device 200 is operated by a user registered beforehand in MFP 100 so that only the shooting notice transmitted from portable information device 200 can be received. Notice reception portion 57 receiving the shooting notice then outputs a set of a notice reception signal indicating that the shooting notice is received and the device identification information of portable information device 200 to data decision portion 53 and related data transmission portion 59.

At the point of time when the notice reception signal is input from notice reception portion 57, data decision portion 53 decides related data that is related to the operation screen appearing on display unit 161 among data held at that point of time. Data decision portion 53 outputs the decided related data to related data transmission portion 59. Data decision portion 53 includes a setting value decision portion 81, a history specifying portion 83, a preview data acquisition portion 85, a page number specifying portion 87, and a selected data acquisition portion 89. Setting value decision portion 81, history specifying portion 83, preview data acquisition portion 85, page number specifying portion 87, and selected data acquisition portion 89 each decides related data.

Setting value decision portion 81 decides a setting value set in the setting screen as related data if a setting screen is displayed on display unit 161 by setting screen display portion 71 at the point of time when the notice reception signal is input from notice reception portion 57. If a setting screen is displayed on display unit 161 by setting screen display portion 71, a setting value is accepted by process control portion 63 and stored into RAM 114. Setting value decision portion 81 acquires the setting value by reading out the setting value from RAM 114. The setting value set in the setting screen is not limited to a setting value displayed on the setting screen but includes all the setting values for executing the process corresponding to the setting screen. For example, in a case where the setting screen includes an area for displaying the number of sheets for image formation as a setting value for executing an image forming process, all the setting values set as setting values for executing the image forming process are included. The setting values for executing an image forming process include, for example, the size of sheet, the enlargement/reduction ratio, whether to sort, and the like.

History specifying portion 83 specifies history information included in a job history screen and decides the specified history information as related data if a job history screen is displayed on display unit 161 by job history display portion 73 at the point of time when the notice reception signal is input from notice reception portion 57. If the job history screen includes a plurality of history information, one history information selected from among a plurality of history information is specified through user's operation input to operation unit 163.

Preview data acquisition portion 85 acquires data corresponding to an image included in a preview screen and decides the acquired data as related data if a preview screen is displayed on display unit 161 by preview screen display portion 75 at the point of time when the notice reception signal is input from notice reception portion 57. The data corresponding to the image included in the preview screen includes data output by document scanning unit 130 reading a document and data read out from HDD 115 or external storage device 117, of data set as process targets by process control portion 63. The acquired data thus may be comprised of a plurality of pages.

Page number specifying portion 87 specifies a page corresponding to an image included in a preview screen and decides page identification information for identifying the specified page as related data if the data specified by preview data acquisition portion 85 is comprised of a plurality of pages.

Selected data acquisition portion 89 decides data selected as a process target by the user on a BOX screen as related data if a BOX screen is displayed on display unit 161 by BOX screen display portion 77 at the point of time when the notice reception signal is input from notice reception portion 57. With the BOX screen displayed on display unit 161 by BOX screen display portion 77, the user can operate operation unit 163 to select one of data identification information included in the area for displaying a list of data in the BOX screen. Selected data acquisition portion 89 accepts the user's operation input to operation unit 163, specifies the one selected by the user from among data identification information included in the area for displaying a list of data in the BOX screen, and acquires the specified data from HDD 115 or external storage device 117.

Related data transmission portion 59 receives a set of the user identification information and the device identification information from authentication portion 55, receives a set of the notice reception signal and the device identification information from notice reception portion 57, and receives the related data from data decision portion 53. If a set of the notice reception signal and the same device identification information as the device identification information input from authentication portion 55 is input from notice reception portion 57, related data transmission portion 59 transmits the related data input from data decision portion 53 to portable information device 200 identified by the device identification information through communication I/F unit 112.

After a set of the user identification information and the device identification information is input from authentication portion 55, remote control portion 61 receives a remote operation command transmitted from portable information device 200 specified by the device identification information. When communication I/F unit 112 receives a remote operation command, remote control portion 61 acquires the device identification information of the device that has transmitted the remote operation command, and compares the acquired device identification information with the device identification information input from authentication portion 55. If the device identification information of the device that has transmitted the remote operation command is the same as the device identification information input from authentication portion 55, remote control portion 61 acquires the remote operation command received by communication I/F unit 112. If they are different, remote control portion 61 discards the remote operation command received by communication I/F unit 112. Accordingly, the remote operation command can be received only when the user authenticated by authentication portion 55 operates portable information device 200.

When a remote operation command is received, remote control portion 61 allows process control portion 63 to execute a process in accordance with the remote operation command. The remote operation command includes related data as described later. The remote operation command includes a remote operation command to set a setting value and a remote operation command to set a process target. The related data included in the remote operation command to set a setting value is a setting value, and the related data included in the remote operation command to set a process target is data different from a setting value.

When a remote operation command to set a setting value is received, remote control portion 61 sets a setting value that is related data included in the remote operation command. Specifically, a setting value is stored into RAM 114. When a remote operation command to set a process target is received, remote control portion 61 sets data included in related data included in the remote operation command as a process target. Specifically, data included in the related data is stored into RAM 114.

Figure 6:
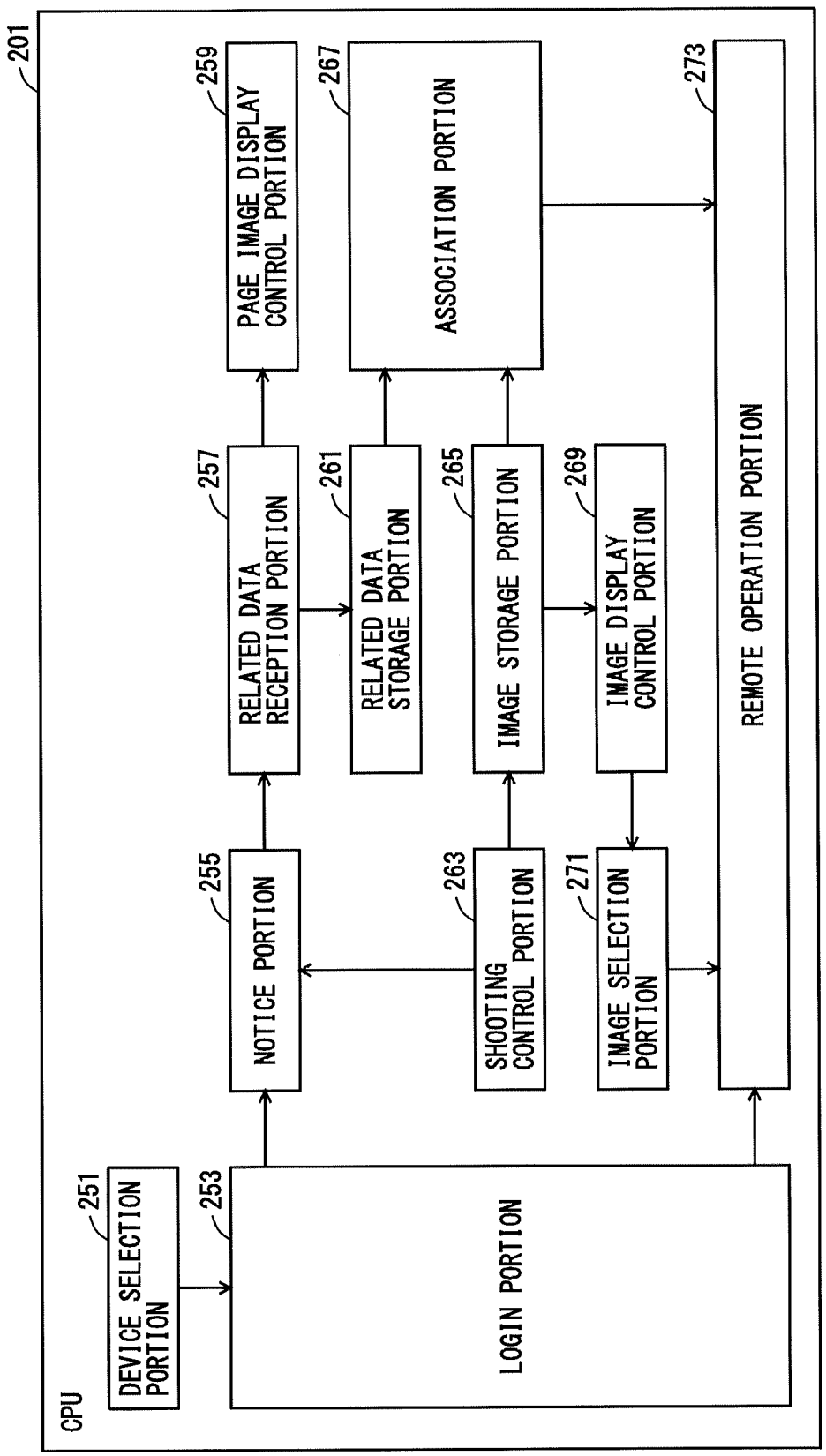
FIG. 6 is a block diagram showing an overview of functions of a CPU of the portable information device in the present embodiment.

FIG. 6 is a block diagram showing an overview of functions of the CPU of the portable information device in the present embodiment. The functions shown in FIG. 6 are formed in CPU 201 by CPU 201 of portable information device 200 executing a remote operation program stored in flash memory 203. Referring to FIG. 6, CPU 201 of portable information device 200 includes a device selection portion 251 selecting a device serving as a target for remote operation, a login portion 253 logging in to the device serving as a target for remote operation, a shooting control portion 263 controlling camera 202, a notice portion 255 for giving a notice that an image is shot by camera 202 to the device serving as a target for remote operation, an image storage portion 265 storing an image shot by camera 202, a related data reception portion 257 receiving related data from the device serving as a target for remote operation, a page image display control portion 259 displaying the related data, an association portion 267 associating the related data with the shot image, an image display control portion 269 displaying the shot image stored by image storage portion 265, an image selection portion 271 selecting the shot image, and a remote operation portion 273 remotely operating the device serving as a target for remote operation.

Device selection portion 251 selects a device selected by the user from among MFPs 100, 101, 102 as a device serving as a target for remote operation. MFPs 100, 101, 102 are registered beforehand in device selection portion 251 as devices that can be a target for remote operation. Device selection portion 251 displays a select screen including the respective device identification information of MFPs 100, 101, 102 on display unit 206. The user inputs operation of selecting the device identification information displayed on the select screen into operation unit 207, so that device selection portion 251 selects the device having the device identification information selected from among MFPs 100, 101, 102 as a device serving as a target for remote operation. Device selection portion 251 outputs the device identification information of the device selected as a device serving as a target for remote operation to login portion 253.

Login portion 253 logs in to the device serving as a target for remote operation in response to input of the device identification information of the device serving as a target for remote operation from device selection portion 251. Here, it is assumed that MFP 100 is selected by the user as a device serving as a target for remote operation, by way of example. Specifically, a login request is transmitted to MFP 100 through wireless LAN I/F 208. MFP 100 receiving the login request returns a login screen, so that login portion 253 displays the login screen received from MFP 100 on display unit 206 and accepts user identification information and authentication information input to operation unit 207 by the user in accordance with the login screen. Login portion 253 transmits a set of the accepted user identification information and authentication information to MFP 100 through wireless LAN I/F 208. MFP 100 then returns a permission signal if the login is permitted or returns a non-permission signal if the login is not permitted, as described above. If wireless LAN I/F 208 receives a permission signal from MFP 100, login portion 253 outputs the device identification information of MFP 100 permitted to log in to notice portion 255 and remote operation portion 273.

Shooting control portion 263 controls camera 202 and allows camera 202 to shoot an image when the user presses a shutter button included in operation unit 207. Shooting control portion 263 then accepts the shot image output by camera 202 shooting an image of a subject. The subject of camera 202 is the operation screen displayed on display unit 161 of MFP 100 serving as a target for remote operation. Shooting control portion 263 outputs the accepted shot image to image storage portion 265 and outputs a notice instruction to allow notice portion 255 to give a notice that an image is shot.

Image storage portion 265 stores the shot image into flash memory 203 and outputs image identification information for identifying the shot image to association portion 267.

After the device identification information of the device serving as a target for remote operation is input from login portion 253, notice portion 255 transmits a shooting notice indicating that an image is shot to the device serving as a target for remote operation that is specified by the device identification information, in response to input of the notice instruction from shooting control portion 263, and outputs the device identification information of the device serving as a target for remote operation that the shooting notice is transmitted to, to related data reception portion 257. In other words, notice portion 255 notifies MFP 100 that the user operating portable information device 200 shoots an image of an operation screen, as a subject, that is displayed on display unit 161 of MFP 100, that is, the device serving as a target for remote operation.

Related data reception portion 257 receives the device identification information from notice portion 255. As described above, when MFP 100 is a device serving as a target for remote operation, MFP 100 returns related data in response to the shooting notice being received from portable information device 200, so that related data reception portion 257 acquires the related data received by wireless LAN I/F 208 from MFP 100. When the device identification information of the device that has transmitted the related data received by wireless LAN I/F 208 is the same as the device identification information input from notice portion 255, related data reception portion 257 receives the related data. Accordingly, related data can be received only from the device that the shooting notice is transmitted to. Related data reception portion 257 outputs a set of the received related data and the device identification information to related data storage portion 261 and to page image display control portion 259.

Page image display control portion 259 receives related data from related data reception portion 257 and determines whether the related data includes page identification information. If the related data includes page identification information, page image display control portion 259 controls display unit 206 to display an image of the page specified by the page identification information, of data of a plurality of pages included in the related data.

An example in which the device serving as a target for remote operation is MFP 100 will be specifically described. In the case where page image display control portion 259 displays an image of a page of related data on display unit 206, the user operates portable information device 200 to log in to MFP 100 with a preview screen appearing on display unit 161 of MFP 100 and thereafter presses the shutter button of operation unit 207 to shoot the preview screen appearing on display unit 161 as a subject. In this case, MFP 100 transmits data corresponding to the image included in the preview screen and page identification information of the page of the image as related data to portable information device 200. Page image display control portion 259 displays the image of the page specified by the page identification information, of data of a plurality of pages included in the related data received from MFP 100, so that the image displayed on display unit 206 is the same as the image included in the preview screen displayed on display unit 206 of MFP 100. The user therefore can confirm that the data corresponding to the image included in the preview screen is transferred from MFP 100 to portable information device 200, based on that the same image is displayed on the source and the destination of data transmitted.

Related data storage portion 261 stores a set of related data and device identification information into flash memory 203 and outputs the data identification information for identifying the related data to association portion 267.

Association portion 267 associates related data with a shot image. Association portion 267 receives the data identification information of related data from related data storage portion 261 and receives the image identification information of a shot image from image storage portion 265. Association portion 267 generates an association record including the data identification information and the image identification information and stores the generated association record into flash memory 203.

Image display control portion 269 displays the shot image stored in flash memory 203 by image storage portion 265 on display unit 206. If a plurality of shot images are stored in flash memory 203 by image storage portion 265, a plurality of shot images are displayed. A plurality of shot images may be displayed in one screen, or screens each including one or more shot images may be successively displayed. The shot images may be reduced in size for display.

Image selection portion 271 selects a shot image displayed on display unit 206. One is selected from among one or more shot images displayed on display unit 206 in accordance with user's operation input to operation unit 207. Image selection portion 271 outputs the image identification information of the selected shot image to remote operation portion 273.

Remote operation portion 273 receives the device identification information of the device serving as a target for remote operation from login portion 253 and receives the image identification information from image selection portion 271. In response to input of the image identification information from image selection portion 271, remote operation portion 273 acquires related data associated with the image identification information by association portion 267. Since association portion 267 stores the association records in flash memory 203, the association record that includes the image identification information input from image selection portion 271 is extracted from the association records stored in flash memory 203, and the data identification information included in the extracted association record is acquired. The related data specified by the acquired data identification information is then acquired from the related data stored in flash memory 203. Remote operation portion 273 generates a remote operation command including the related data and transmits the generated remote operation command to the device specified by the device identification information input from login portion 253 through wireless LAN I/F 208.

Remote operation portion 273 generates a remote operation command to allow the device serving as a target for remote operation to set a setting value included in the related data if the related data includes a setting value for MFPs 100, 101, 102 to execute a process. Remote operation portion 273 generates a remote operation command to allow the device serving as a target for remote operation to set the related data as a process target if the related data does not include a setting value. The operation of MFPs 100, 101, 102 receiving the remote operation command has been described above and therefore is not repeated here.

The device serving as a target for remote operation at the stage when notice portion 255 transmits a shooting notice may be the same as or different from the device serving as a target for remote operation at the stage when remote operation portion 273 transmits a remote operation command.

Figure 7:
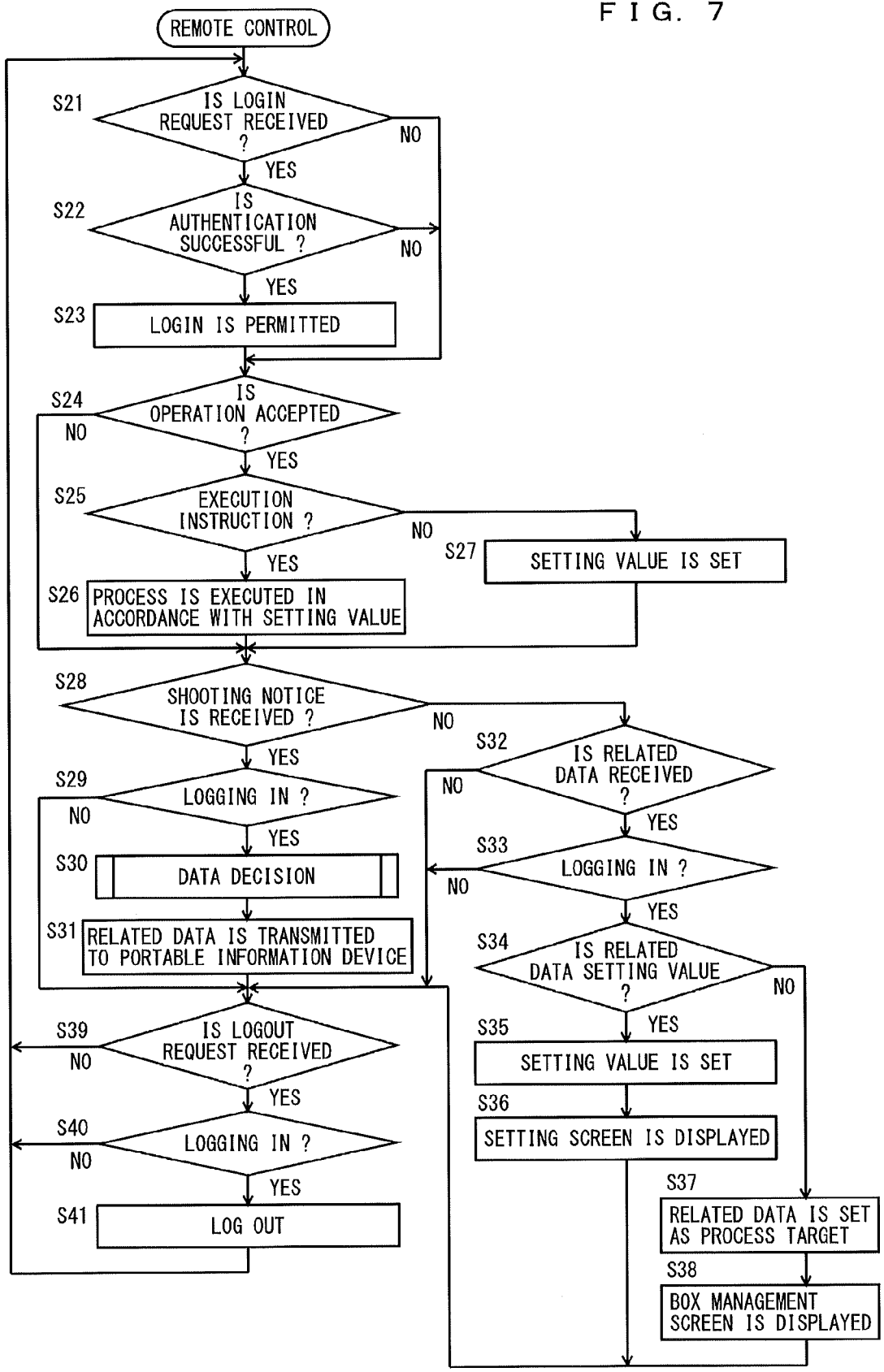
FIG. 7 is a flowchart showing an exemplary flow of a remote control process.

FIG. 7 is a flowchart showing an exemplary flow of a remote control process. The remote control process is a process executed by CPU 111 of MFP 100 executing a remote control program stored in ROM 113, HDD 115, or CD-ROM 118.

Referring to FIG. 7, CPU 111 determines whether a login request is received (step S21). If communication I/F unit 112 establishes connection with portable information device 200 and receives a login request from portable information device 200, the process proceeds to step S22. If a login request is not received, the process proceeds to step S24.

In step S22, it is determined whether authentication is successful. If authentication is successful, the process proceeds to step S23. If authentication is failed, the process proceeds to step S24. Specifically, a login screen is transmitted to portable information device 200 through communication I/F unit 112, and the user identification information and authentication information transmitted by portable information device 200 is received. The received user identification information and authentication information is then compared with the user data stored in HDD 115. If they agree, it is determined that authentication is successful. If they do not agree, it is determined that authentication is failed. In step S23, the login by the user of portable information device 200 is permitted. The process then proceeds to step S24.

In step S24, it is determined whether operation is accepted. Operation is accepted when the user inputs operation to operation unit 163. If authentication of the user of portable information device 200 is successful and login is permitted in step S22, when communication I/F unit 112 receives a remote operation command from portable information device 200, the operation determined by the received remote operation command is accepted. If operation is accepted, the process proceeds to step S25. If not, the process proceeds to step S28.

In step S25, it is determined whether the accepted operation is an execution instruction to give an instruction to execute a process. If it is an execution instruction, the process proceeds to step S26. If not, the process proceeds to step S27. In step S26, the process is executed in accordance with a setting value. The process then proceeds to step S28. The process executed in step S26 includes, for example, an image forming process of controlling image forming unit 140 for forming an image, a document scanning process of controlling document scanning unit 130 for scanning an image of a document, a data transmitting/receiving process of controlling commination I/F unit 112 for transmitting/receiving data, a facsimile transmitting/receiving process of controlling facsimile unit 116 for transmitting/receiving facsimile data, and a data management process of controlling HDD 115 or external storage device 117 for writing or reading data.

On the other hand, the process proceeds to step S27 when the accepted operation is operation of setting a setting value. In step S27, a setting value is set, and the process proceeds to step S28. For example, input of a setting value specified by the operation is accepted, and the setting value set so far is updated with the input setting value. When the operation accepted in step S24 is operation of switching the operation screen displayed on display unit 161, the operation screen specified by the operation is displayed on display unit 161.

In step S28, it is determined whether a shooting notice is received. If a shooting notice is received, the process proceeds to step S29. If not, the process proceeds to step S32. In step S29, it is determined whether the user who operates the device that has transmitted the shooting notice is logging in. If the user is logging in, the process proceeds to step S30. If not, the process proceeds to step S32. It is determined whether the device that has transmitted the shooting notice is the same as portable information device 200 operated by the user permitted to log in in step S23. More specifically, if the device identification information of the device that has transmitted the login request received in step S21 is the same as the device identification information of the device that has transmitted the shooting notice received in step S28, it is determined that the user is logging in.

In step S30, a data decision process is executed, and the process proceeds to step S31. The data decision process, which will be detailed later, is a process of selecting and deciding related data that is related to the operation screen displayed on display unit 161 from among data held at that point of time. In step S31, the related data is transmitted to portable information device 200 that has transmitted the shooting notice. The process then proceeds to step S39.

In step S32, it is determined whether the related data is received. If the related data is received, the process proceeds to step S33. If not, the process proceeds to step S39. In step S33, it is determined whether the user who operates the device that has transmitted the related data is logging in. If the user is logging in, the process proceeds to step S34. If not, the process proceeds to step S39. It is determined whether the device that has transmitted the related data is the same as portable information device 200 operated by the user permitted to log in in step S23. More specifically, if the device identification information of the device that has transmitted the login request received in step S21 is the same as the device identification information of the device that has transmitted the related data received in step S32, it is determined that the user is logging in.

In step S34, it is determined whether the related data includes a setting value. If the related data includes a setting value, the process proceeds to step S35. If not, the process proceeds to step S37. In step S35, the setting value included in the related data is set. The process then proceeds to step S36. The setting value set so far is updated with the setting value included in the related data. In the next step S36, a setting screen is displayed on display unit 161. The process then proceeds to step S39. Here, the setting screen displayed on display unit 161 is a setting screen that includes the item for which the setting value is set in step S35.

On the other hand, the process proceeds to step S37 when the related data does not include a setting value but includes data. In step S37, the data included in the related data is set as a process target. The process then proceeds to step S38. Here, the data included in the related data is stored into HDD 115, and the stored data is set as a process target. In step S38, a BOX management screen is displayed. The process then proceeds to step S39. The BOX management screen displayed here is in a state in which the data stored in HDD 115 in step S37 is selected.

In step S39, it is determined whether a logout request is received. If a logout request is received, the process proceeds to step S40. If not, the process returns to step S21. In step S40, it is determined whether the user who operates the device that has transmitted the logout request is logging in. If the user is logging in, the process proceeds to step S41. If not, the process returns to step S21. It is determined whether the device that has transmitted the logout request is the same as portable information device 200 operated by the user permitted to log in in step S23. More specifically, if the device identification information of the device that has transmitted the login request received in step S21 is the same as the device identification information of the device that has transmitted the logout request received in step S39, it is determined that the user is logging in.

In step S41, the user permitted to log in in step S23 is logged out. The process then returns to step S21.

Figure 8:
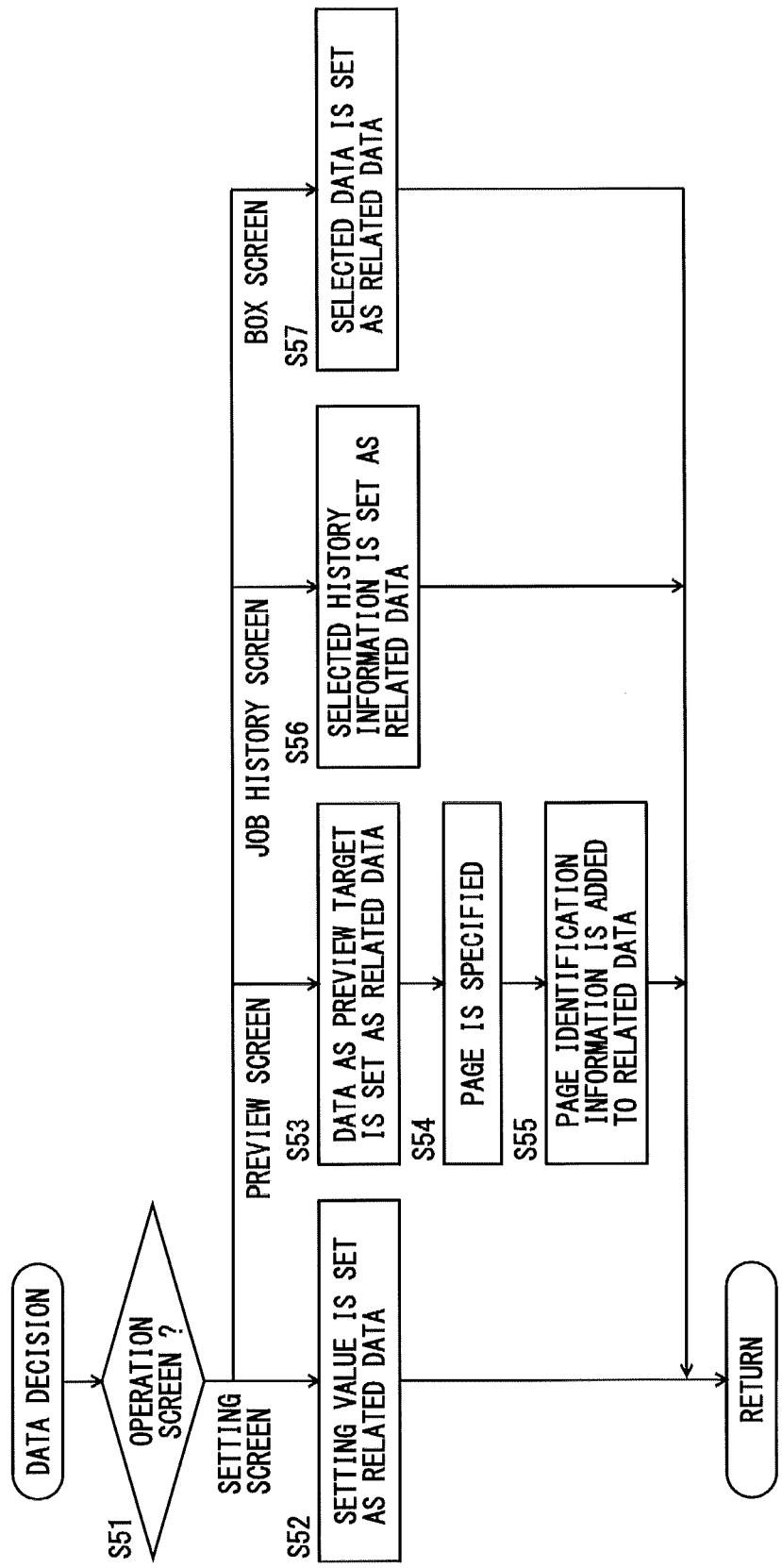
FIG. 8 is a flowchart showing an exemplary flow of a data decision process.

FIG. 8 is a flowchart showing an exemplary flow of the data decision process. The data decision process is a process executed in step S30 in FIG. 7. Referring to FIG. 8, the kind of the operation screen displayed on display unit 161 is determined, and the process branches depending on the kind of the operation screen (step S51). If the operation screen is a setting screen, the process proceeds to step S52. If the operation screen is a preview screen, the process proceeds to step S53. If the operation screen is a job history screen, the process proceeds to step S56. If the operation screen is a BOX screen, the process proceeds to step S57.

In step S52, the setting value set in the setting screen displayed on display unit 161 is set as the related data. The process then returns to the remote control process. The setting value set in the setting screen includes a setting value for use in an image forming process, a setting value for use in a document scanning process, a setting value for use in a data transmitting/receiving process, a setting value for use in a facsimile transmitting/receiving process, and a setting value for use in a data management process. The setting value set in the setting screen is not limited to the setting value set in the setting screen but includes all the setting values for executing a process corresponding to the setting screen. For example, in a case where the setting screen includes an area for displaying a number of sheets for image formation as a setting value for executing an image forming process, all the setting values set as setting values for executing the image forming process are included. The setting values for executing an image forming process include, for example, the size of paper, the enlargement/reduction ratio, whether to sort, and the like.

In step S53, data as a preview target is set as the related data. Specifically, data corresponding to the image included in the preview screen displayed on display unit 161 is acquired, and the acquired data is set as the related data. The data corresponding to the image included in the preview screen includes, for example, data output by document scanning unit 130 scanning a document and data read out from HDD 115 or external storage device 117. The acquired data therefore may be comprised of a plurality of pages.

In the next step S54, the page of the image displayed in the preview screen is specified. If the data specified in step S53 is comprised of a plurality of pages, the page corresponding to the image included in the preview screen is specified. The page identification information for identifying the specified page is then set as the related data (step S55). The process then returns to the remote control process.

In step S56, the history information selected in the job history screen is set as the related data. The process then returns to the remote control process. Specifically, the history information included in the job history screen displayed on display unit 161 is specified, and the specified history information is decided as the related data. If the job history screen includes a plurality of history information, one history information selected from among a plurality of history information is specified through user's operation input to operation unit 163.

In step S57, the data selected in the BOX screen is set as the related data. The process then returns to the remote control process. Specifically, with the BOX screen appearing on display unit 161, the user can operate operation unit 163 to select one of data identification information included in the area for displaying a list of data in the BOX screen. The data selected as a process target by the user on the BOX screen displayed on display unit 161 is set as related data.

Figure 9:
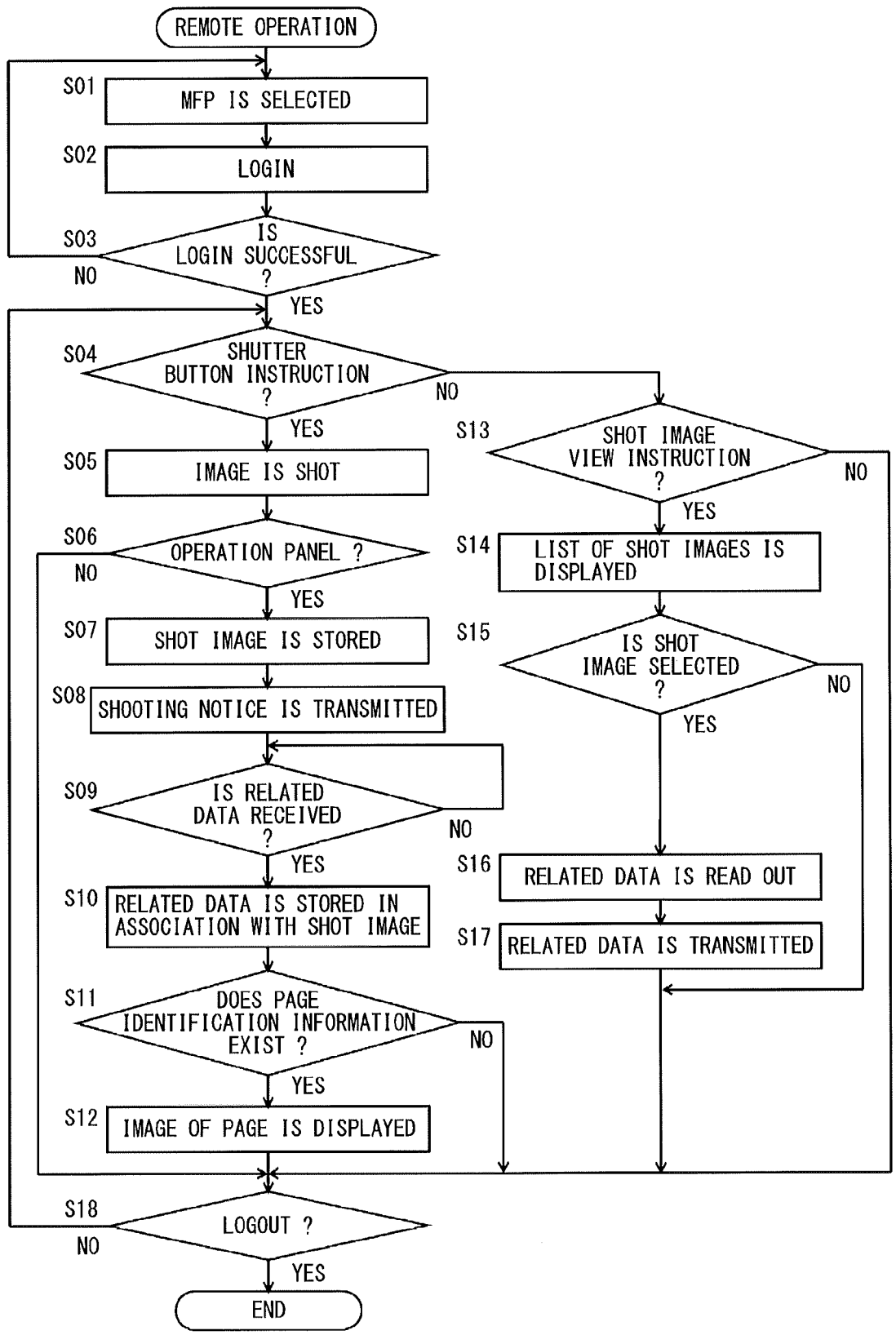
FIG. 9 is a flowchart showing an exemplary flow of a remote operation process.

FIG. 9 is a flowchart showing an exemplary flow of a remote operation process. The remote operation process is a process executed by CPU 201 of portable information device 200 executing a remote operation program stored in flash memory 203. Referring to FIG. 9, CPU 201 selects one of MFPs 100, 101, 102 (step S01). A select screen including the respective device identification information of MFPs 100, 101, 102 registered beforehand as devices that can serve as a target for remote operation is displayed on display unit 206, so that the user inputs operation of selecting device identification information displayed on the select screen into operation unit 207. The device having the device identification information selected from among MFPs 100, 101, 102 is thus selected. In the following description, the user selects MFP 100 as a device that can serve as a target for remote operation, by way of example.

In the next step S02, the selected device is logged in. A login request is transmitted to MFP 100, and a login screen returned by MFP 100 is displayed on display unit 206. The user identification information and authentication information input by the user to operation unit 207 in accordance with the login screen is transmitted to MFP 100. It is then determined whether login is successful (step S03). If login is successful, the process proceeds to step S04. If not, the process returns to step S01.

In step S04, it is determined whether the shutter button is pressed. If the shutter button of operation unit 207 is pressed by the user, the process proceeds to step S05. If not, the process proceeds to step S11.

In step S05, camera 202 is controlled to shoot an image. In the next step S06, it is determined whether the subject of camera 202 is operation panel 160 of MFP 100. If the subject of camera 202 is operation panel 160, the process proceeds to step S07. If not, the process proceeds to step S11. For example, when MFP 100 is registered in the portable information device as a device that can serve as a target for remote operation, an image of operation panel 160 of MFP 100 as a subject is shot by camera 202, and the shot image output by camera 202 is stored as a registered image. The shot image obtained by shooting an image in step S05 is then compared with the registered image, whereby it is determined whether the subject is operation panel 160.

In step S07, the shot image output by camera 202 shooting an image in step S05 is stored into a predetermined area of flash memory 203. In the next step S08, a shooting notice is transmitted. A shooting notice indicating that an image is shot is transmitted to MFP 100 that is logged in in step S02 through wireless LAN I/F 208. MFP 100 receiving the shooting notice returns related data. In the next step S09, the process waits until related data is received from MFP 100 (NO in step S09). If related data is received, the process proceeds to step S10. If the device identification information of the device that has transmitted the related data received by wireless LAN I/F 208 is the same as the device identification information of the device that is logged in in step S02, here, MFP 100, related data is received. In this manner, related data can be received only from the device that the shooting notice is transmitted to in step S08.

In step S10, the related data received in step S09 is associated with the shot image stored in step S07 for storage into flash memory 203. The process then proceeds to step S11.

In step S11, it is determined whether the related data received in step S09 includes page identification information. If the related data includes page identification information, the process proceeds to step S12. If not, the process proceeds to step S18. In step S12, an image of a page is displayed on display unit 206. The process then proceeds to step S13. Specifically, if the related data includes page identification information, the data included in the related data is comprised of a plurality of pages. Therefore, of a plurality of pages of the data included in the related data, the image of the page specified by the page identification information included in the related data is displayed on display unit 206. Accordingly, the same image as the image displayed at MFP 100 is displayed on display unit 206, so that the user can confirm that the data set as a display target in MFP 100 is transmitted to and stored in portable information device 200.

In step S13, it is determined whether a shot image view instruction is accepted. If a shot image view instruction is accepted, the process proceeds to step S14. If not, the process proceeds to step S18. A shot image view instruction is operation of giving an instruction to view the shot image stored in flash memory 203 in step S07. In step S14, the shot image stored in flash memory 203 is displayed on display unit 206. If a plurality of shot images are stored in flash memory 203, a list of a plurality of shot images is displayed. A plurality of shot images may be displayed in one screen, or screens each including one or more shot images may be successively displayed.

In the next step S15, it is determined whether the shot image displayed on display unit 206 is selected by the user. If one is selected from one or more shot images displayed on display unit 206 in accordance with user's operation input to operation unit 207, the process proceeds to step S16. If not, the process proceeds to step S18.

In step S16, the related data that is related to the selected shot image is read out from flash memory 203. The related data stored in flash memory 203 is associated with the shot image and stored into flash memory 203 in step S10. Since the shot image selected by the user is associated with any one of the related data stored in flash memory 203, the related data associated with the shot image selected by the user is read out.

In the next step S17, the related data is transmitted to the device that is logged in in step S03, here, to MFP 100. The process then proceeds to step S18. In step S18, it is determined whether a logout instruction is accepted. If a logout instruction is accepted, the process ends. If not, the process returns to step S04.

A flow of forming an image using portable information device 200 and MFPs 100, 101, 102 will now be specifically described. In the description here, the user first operates MFP 100 to form an image and thereafter operates MFP 101 to form an image, by way of example.

Figure 10:
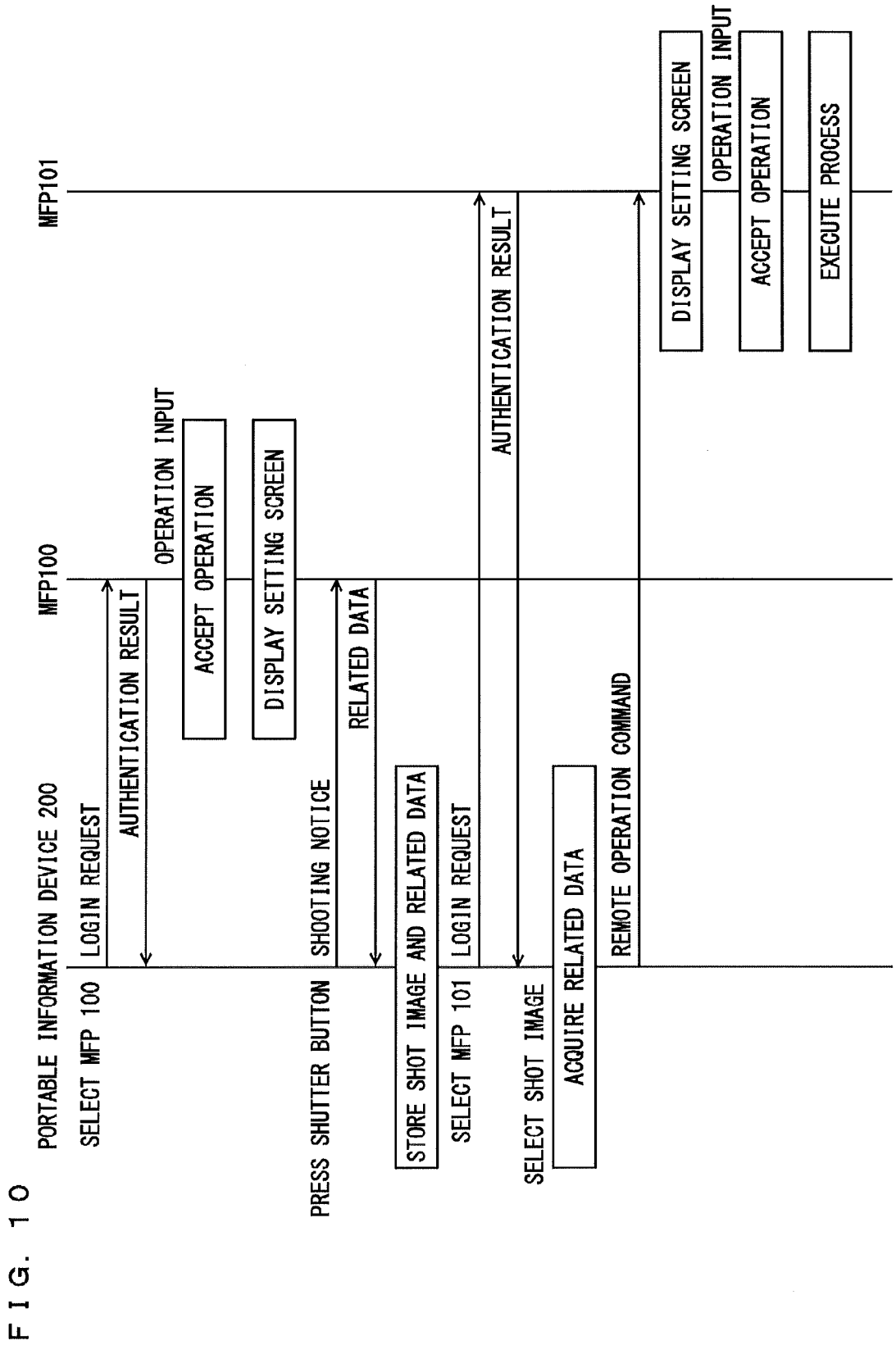
FIG. 10 is a first diagram showing an exemplary flow of forming an image between the portable information device and the MFPs.

FIG. 10 is a first diagram showing an exemplary flow of forming an image between the portable information device and the MFPs. Referring to FIG. 10, the flow of time is shown from above to below, and the respective time axes of portable information device 200, MFP 100, and MFP 101 are shown from the left in this order. First, the user operates portable information device 200 to select MFP 100 as a target for remote operation. Portable information device 200 then transmits a login request to MFP 100. MFP 100 receives the login request and, if authentication is successful, returns the authentication result to portable information device 200.

Afterwards, when the user of portable information device 200 operates operation unit 163 of MFP 100 to input operation, MFP 100 accepts the operation input by the user and displays a setting screen. If the user inputs operation of setting a setting value, the input setting value is set.

Next, the user operates portable information device 200 and presses the shutter button with the angle of view of camera 202 set to operation panel 160 of MFP 100 as a subject. Portable information device 200 then transmits a shooting notice to MFP 100. MFP 100 receiving the shooting notice returns related data that is related to the setting screen displayed on display unit 161, here, the related data including the setting value included in the setting screen.

Portable information device 200 then receives the related data and stores the related data in association with the shot image. Afterwards, the user may operate operation unit 163 of MFP 100 to execute a process of forming an image, for example.

Next, the user operates portable information device 200 to select MFP 101 as a target for remote operation. Portable information device 200 then transmits a login request to MFP 101. MFP 101 receives the login request and, if authentication is successful, returns the authentication result to portable information device 200.

Afterwards, the user of portable information device 200 selects the shot image stored in portable information device 200. Portable information device 200 then acquires the related data stored in association with the shot image selected by the user and transmits a remote operation command including the related data. Here, if the shot image obtained by shooting an image of operation panel 160 was selected in a state in which a setting screen is displayed on display unit 161 of MFP 100, a remote operation command including the related data received from MFP 100 earlier is transmitted to MFP 101. The related data received from MFP 100 includes a setting value.

MFP 101 receiving the related data from portable information device 200 then sets the setting value included in the related data and displays a setting screen including the setting value. The same setting value as the setting value set in MFP 100 is therefore set in MFP 101. The user thus does not have to input operation of setting a setting value in MFP 101. Afterwards, when the user operates operation unit 163 of MFP 101, MFP 101 accepts the input operation and executes a process.

In the example shown in FIG. 10, the user presses the shutter button of portable information device 200 in a state in which a setting screen is displayed on display unit 161 of MFP 100. By contrast, in a case where the user presses the shutter button of portable information device 200 in a state in which a job history screen is displayed on display unit 161 of MFP 100, the related data transmitted from MFP 100 includes history information. In addition, the related data included in the remote operation command transmitted to MFP 101 includes history information.

More specifically, the user operates portable information device 200 to log in to MFP 100 and presses the shutter button of portable information device 200 to shoot the job history screen displayed on display unit 161 of MFP 100 as a subject. MFP 100 then returns the related data including the history information selected in the job history screen to portable information device 200. Portable information device 200 stores the shot image obtained by shooting an image of the job history screen and the related data. The user then operates portable information device 200 to log in to MFP 101 and selects the shot image obtained by shooting an image of the job history screen. Portable information device 200 in turn returns the related data associated with the shot image to MFP 101. This related data includes history information indicating history of the process executed in MFP 100. MFP 101 receiving the related data sets the setting value included in the history information included in the related data, so that the same setting value as the setting value used in the process executed in MFP 100 is set in MFP 101. For example, in a case where history information of execution of a facsimile transmitting process has been selected in the job history screen, the history information includes the facsimile number of a transmission destination of facsimile. In this case, MFP 101 sets the facsimile number included in the history information as a setting of transmission destination. The user therefore does not have to input operation of setting a facsimile number in MFP 101.

The history information may include, for example, history information in a case where a process of transmitting/receiving an email is executed. In the case where the history information includes history information of execution of a process of transmitting/receiving an email, the email address of the sender/recipient of the email is the setting value. The history information may include history information in a case where a process of transmitting/receiving a file is executed. If the history information includes history information of execution of a process of transmitting/receiving a file, the IP (Internet Protocol) address of the device sending/receiving the file is the setting value.

Figure 11:
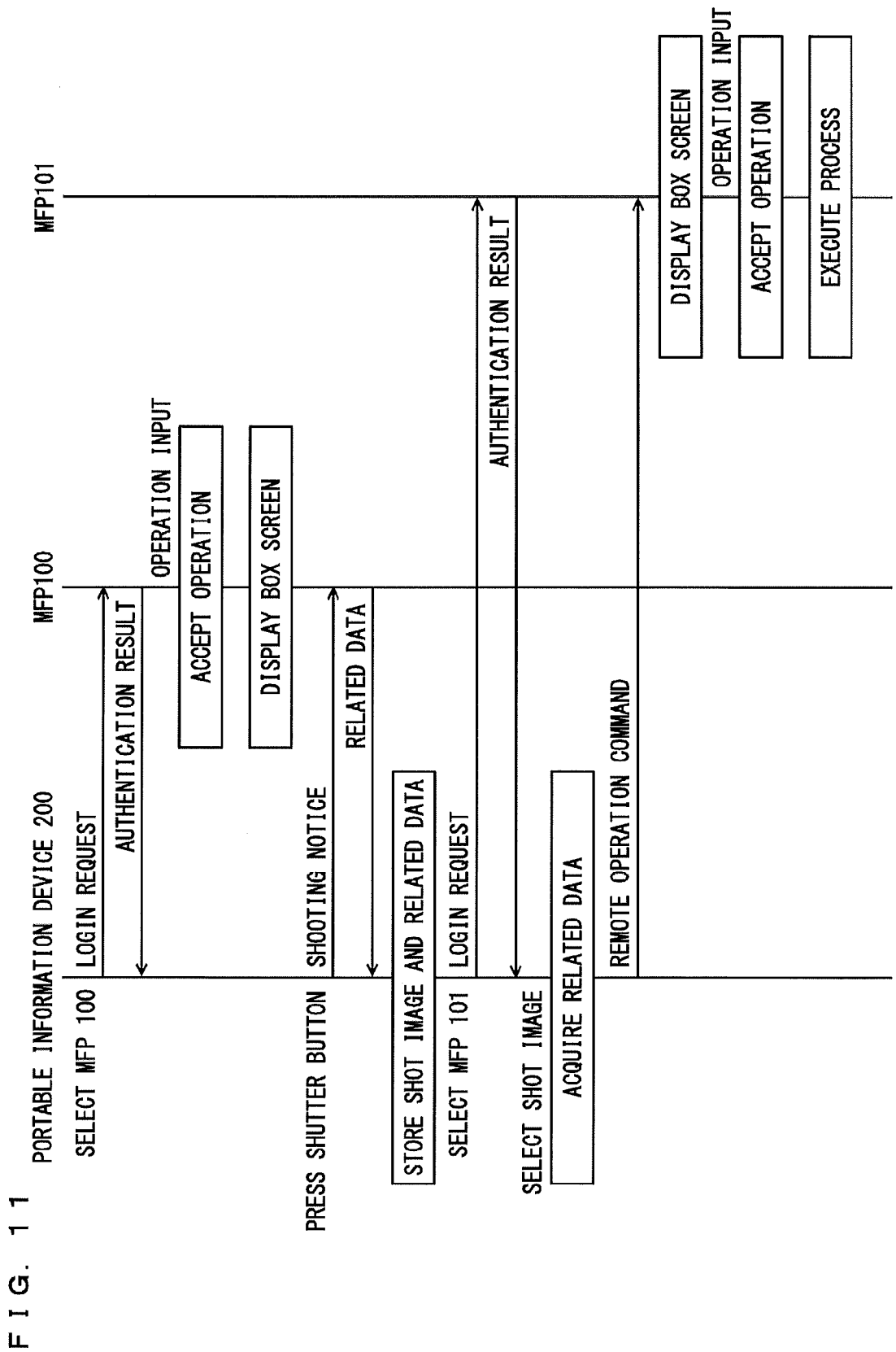
FIG. 11 is a second diagram showing an exemplary flow of forming an image between the portable information device and the MFPs.

FIG. 11 is a second diagram showing an exemplary flow of forming an image between the portable information device and the MFPs. Referring to FIG. 11, the flow of time is shown from above to below, and the respective time axes of portable information device 200, MFP 100, and MFP 101 are shown from the left in this order. First, the user operates portable information device 200 to select MFP 100 as a target for remote operation. Portable information device 200 then transmits a login request to MFP 100. MFP 100 receives the login request and, if authentication is successful, returns the authentication result to portable information device 200.

Afterwards, when the user of portable information device 200 operates operation unit 163 of MFP 100 and inputs operation, MFP 100 accepts the operation input by the user and displays a BOX screen. If the user inputs operation of selecting data identification information included in the BOX screen, MFP 100 sets the data specified by the selected data identification information as a process target.

Next, the user operates portable information device 200 and presses the shutter button with the angle of view of camera 202 set to operation panel 160 of MFP 100 as a subject. Portable information device 200 then transmits a shooting notice to MFP 100. MFP 100 receiving the shooting notice returns related data that is related to the BOX screen displayed on display unit 161, here, the related data including the data specified by the data identification information selected in the BOX screen. Afterwards, the user may operate operation unit 163 of MFP 100 to execute a process of forming an image, for example.

Portable information device 200 receives the related data and stores the related data in association with the shot image. Afterwards, the user may operate operation unit 163 of MFP 100 and execute a process of forming an image, for example.

Next, the user operates portable information device 200 to select MFP 101 as a target for remote operation. Portable information device 200 then transmits a login request to MFP 101. MFP 101 receives the login request and, if authentication is successful, returns the authentication result to portable information device 200.

Afterwards, the user of portable information device 200 selects the shot image stored in portable information device 200. Portable information device 200 then acquires the related data stored in association with the shot image selected by the user and transmits a remote operation command including the related data. Here, assuming that the shot image obtained by shooting an image of operation panel 160 was selected in a state in which a BOX screen is displayed on display unit 161 of MFP 100, a remote operation command including the related data received from MFP 100 earlier is transmitted to MFP 101. The related data received from MFP 100 includes data.

MFP 101 receiving the related data from portable information device 200 sets the data included in the related data as a process target and displays a BOX screen in a state in which the data as a process target is selected. Accordingly, the same data as the data selected as a process target in MFP 100 can be set as a process target in MFP 101. Afterward, when the user operates operation unit 163 of MFP 101, MFP 101 accepts the input operation and executes a process on the data set as a process target.

Figure 12:
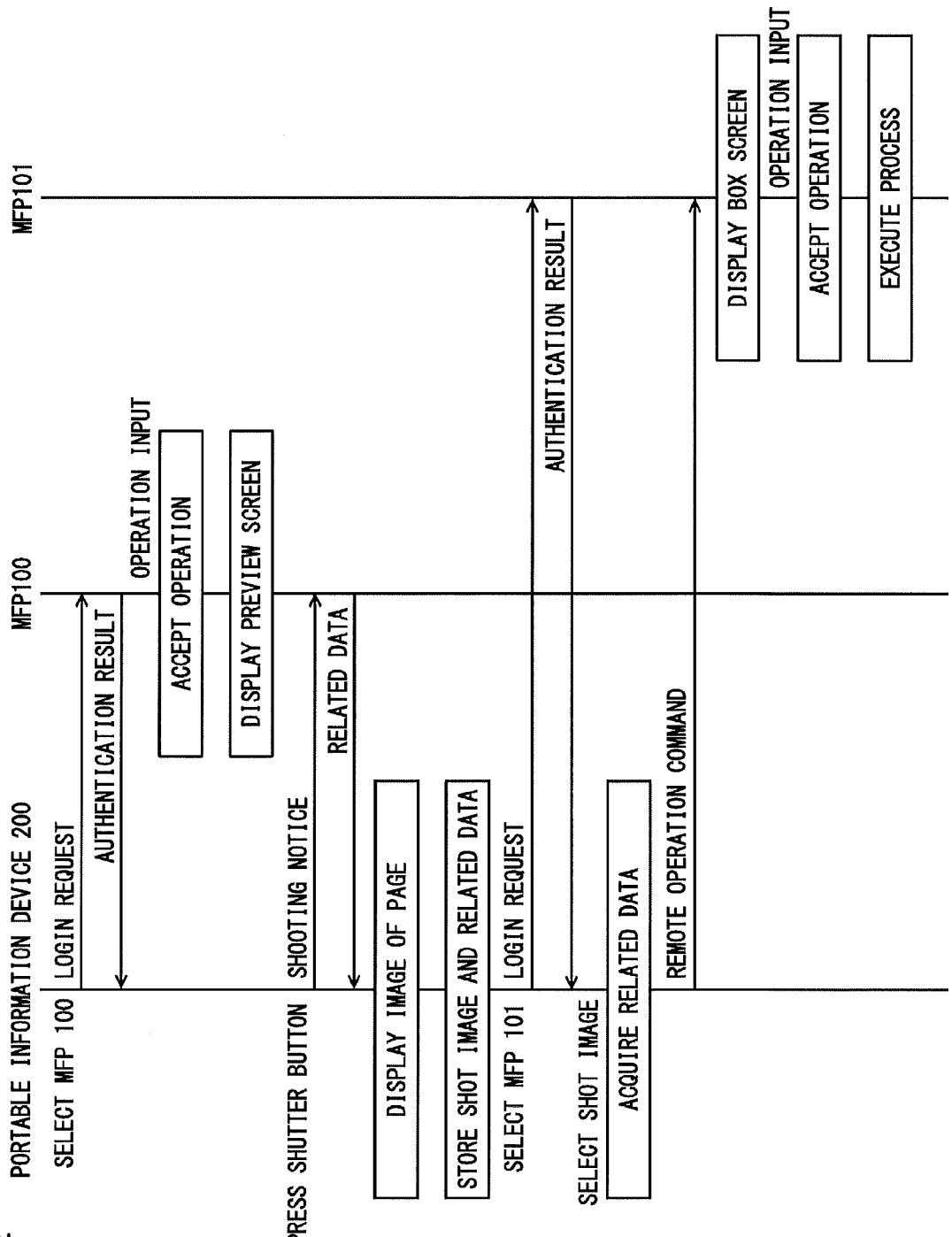
FIG. 12 is a third diagram showing an exemplary flow of forming an image between the portable information device and the MFPs.

FIG. 12 is a third diagram showing an exemplary flow of forming an image between the portable information device and the MFPs. Referring to FIG. 12, the flow of time is shown from above to below, and the respective time axes of portable information device 200, MFP 100, and MFP 101 are shown from the left in this order. First, the user operates portable information device 200 to select MFP 100 as a target for remote operation. Portable information device 200 then transmits a login request to MFP 100. MFP 100 receives the login request and, if authentication is successful, returns the authentication result to portable information device 200.

Afterwards, when the user of portable information device 200 operates operation unit 163 of MFP 100 and inputs operation, MFP 100 accepts the operation input by the user and displays a preview screen.

Next, the user operates portable information device 200 and presses the shutter button with the angle of view of camera 202 set to operation panel 160 of MFP 100 as a subject. Portable information device 200 then transmits a shooting notice to MFP 100. MFP 100 receiving the shooting notice returns related data that is related to the preview screen displayed on display unit 161, here, the related data including the data set as a preview target and page identification information of the page corresponding to the image included in the preview screen.

Portable information device 200 receiving the related data displays the image of the page specified by the page identification information, of a plurality of pages of the data included in the related data, on display unit 161. Accordingly, the same image as the image included in the preview screen displayed on display unit 161 of MFP 100 is displayed on display unit 206 of portable information device 200, so that the user can confirm that the data set as a preview target in MFP 100 is stored into portable information device 200, based on the image of the page displayed on display unit 206.

In addition, portable information device 200 stores the related data in association with the shot image. Afterwards, the user may operate operation unit 163 of MFP 100 to execute a process of forming an image, for example.

Next, the user operates portable information device 200 and selects MFP 101 as a target for remote operation. Portable information device 200 then transmits a login request to MFP 101. MFP 101 receives the login request and, if authentication is successful, returns the authentication result to portable information device 200.

Afterwards, the user of portable information device 200 selects the shot image stored in portable information device 200. Portable information device 200 then acquires the related data stored in association with the shot image selected by the user and transmits a remote operation command including the related data. Here, assuming that the shot image obtained by shooting an image of operation panel 160 was selected in a state in which a preview screen is displayed on display unit 161 of MFP 100, a remote operation command including the related data received from MFP 100 earlier is transmitted to MFP 101. The related data received from MFP 100 includes data and page identification information.

MFP 101 receiving the related data from portable information device 200 sets the data included in the related data as a process target and displays a BOX screen in a state in which the data as a process target is selected. Accordingly, the same data as the data selected as a preview target in MFP 100 can be set as a process target in MFP 101. Afterward, when the user operates operation unit 163 of MFP 101, MFP 101 accepts the input operation and executes a process on the data set as a process target.

For example, operation of scanning a document is input and an image of a preview screen is shot at MFP 100, so that the data obtained by scanning a document in MFP 100 can be set as a process target in MFP 101 when MFP 101 is logged in next time. If operation is subsequently input to MFP 101, the data obtained by scanning a document in MFP 100 can be subjected to image formation, facsimile transmission, file transfer, email transmission, etc. in MFP 101.

As described above, in image forming system 1 in the present embodiment, when portable information device 200 shoots an image of an operation screen displayed on display unit 161 of MFP 100, a shooting notice is transmitted to MFP 100. MFP 100 then transmits, to portable information device 200, related data that is related to the operation screen displayed at the point of time when the shooting notice is received from portable information device 200. Portable information device 200 then stores the related data received from MFP 100. Accordingly, the related data that is related to the operation screen displayed at MFP 100 can be stored into portable information device 200 with such easy operation of shooting the operation screen.

The image obtained by shooting the operation screen of MFP 100 is stored in portable information device 200. In response to the stored image being designated, a remote operation command including the related data associated with the designated image is transmitted to MFP 100. MFP 100 in turn executes a process based on the related data included in the remote operation command. Since the image obtained by shooting the operation screen and the related data are associated with each other, the user looking at the image can easily specify the related data that is related to the operation screen included in the image.

Since MFP 100 executes a process based on the related data received from portable information device 200, the user can bring MFP 100 at present into the state in which MFP 100 was operated in the past, through the operation of selecting the image of the operation screen at the time when MFP 100 was operated in the past.

In a case where the related data is a setting value for MFP 100 to execute a process, a remote operation command to allow MFP 100 to set a setting value is transmitted to MFP 100. Accordingly, a setting value in MFP 100 can be set to the same value as the one at the time when MFP 100 was operated in the past.

In a case where the operation screen displayed at the point of time when a shooting notice is received from portable information device 200 is a setting screen, MFP 100 decides the setting value set in the setting screen as related data. The user therefore can select a setting value to be set in MFP 100 by selecting the image of the setting screen.

In a case where the operation screen displayed at the point of time when a shooting notice is received from portable information device 200 is a history display screen, MFP 100 decides the setting value set for the process specified on the history display screen as related data. The user therefore can set the setting value to be set in MFP 100 to the same value as the setting value at the time when MFP 100 executed the process in the past, by selecting the image of the history display screen.

In a case where one data is selected as a process target from among data stored in HDD 115 at the point of time when a shooting notice is received from portable information device 200, MFP 100 decides the data selected as a process target as related data. If the related data is data that can be processed by MFP 100, portable information device 200 transmits a remote operation command to allow MFP 100 to set the data as a process target. Accordingly, the data to be processed by MFP 100 can be set to the same data as the data that was set as a process target when MFP 100 was operated in the past.

The user can remotely operate MFP 101 in the same state as the state of MFP 100 operated in the past, through the operation of selecting the image of the operation screen at the time when MFP 100 was operated in the past.

In a case where MFP 100 displays a preview screen at the point of time when a shooting notice is received, data comprised of a plurality of pages and page identification information of the page corresponding to the image displayed on the preview screen are decided as the related data. Portable information device 200 then displays the image of the page specified by the page identification information of the data included in the related data. Accordingly, the same image as the image included in the preview screen displayed at MFP 100 is displayed at portable information device 200. As a result, the user is notified that the data including the page displayed in the preview screen is stored into the portable information device.

In a case where MFP 100 displays a BOX screen at the point of time when a shooting notice is received, the data selected in the BOX screen in MFP 100 is decided as the related data, and portable information device 200 stores the data included in the related data into portable information device 200. As a result, the data selected in the BOX screen can be stored into portable information device 200.

Although image forming system 1 has been described in the foregoing embodiment, it is needless to say that the present invention can be understood as a remote operation method to allow MFPs 100, 101, 102 to execute the remote control process shown in FIG. 7 and FIG. 8 and to allow the portable information device to execute the remote operation process shown in FIG. 9, or as a remote control program to allow CPU 111 of each MFP 100, 101, 102 to execute the remote control process and a remote operation program to allow CPU 201 of portable information device 200 to perform the remote operation method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming system configured with an image forming apparatus and a portable information device capable of communicating with the image forming apparatus,
the portable information device comprising:
a shooting portion to shoot an image of a subject; and
a processor configured to
give a notice that an image is shot to the image forming apparatus, in response to an image of an operation screen of the image forming apparatus being shot,
the image forming apparatus comprising:
a display to display an operation screen; and
a processor configured to
in response to the notice being received from the portable information device, decide related data that is related to the operation screen displayed at a point of time when the notice is received, from among data held by the image forming apparatus at that point of time,
wherein if the operation screen displayed at a point of time when the notice is received is a history display screen for displaying history of a process executed in the image forming apparatus, a setting value set for the process specified on the history display screen is decided as related data, and
transmit the decided related data to the portable information device,
the processor of the portable information device is further configured to:
receive the related data from the image forming apparatus in response to the notice; and
store the received related data in a data storage.

2. The image forming system according to claim 1,
the portable information device further comprising
an image storage portion to store an image obtained by the image shooting portion shooting an image of an operation screen of the image forming apparatus,
an association portion to associate the related data received from the image forming apparatus with the stored image,
an image display control portion to display the image stored by the image storage portion, and
a remote operation portion to, in response to the image displayed by the image display control portion being designated, transmit a remote operation command including the related data associated with the designated image to the image forming apparatus,
the image forming apparatus further comprising
a remote control portion to execute a process based on the related data included in the remote operation command, in accordance with the remote operation command received from the portable information device.

3. The image forming system according to claim 2,
wherein the image forming system includes a plurality of image forming apparatuses,
the portable information device further comprising
a device selection portion to select one from among the plurality of image forming apparatuses, wherein
the notice portion gives a notice that an image is shot to a first image forming apparatus selected by the device selection portion from among the plurality of image forming apparatuses, and
the remote operation portion transmits the remote operation command to a second image forming apparatus selected by the device selection portion from among the plurality of image forming apparatuses.

4. An image forming system configured with an image forming apparatus and a portable information device capable of communicating with the image forming apparatus,
the portable information device comprising:
a shooting portion to shoot an image of a subject; and
a processor configured to
give a notice that an image is shot to the image forming apparatus, in response to an image of an operation screen of the image forming apparatus being shot,
the image forming apparatus comprising:
a display to display an operation screen; and
a processor configured to
in response to the notice being received from the portable information device, decide related data that is related to the operation screen displayed at a point of time when the notice is received, from among data held by the image forming apparatus at that point of time,
wherein if the operation screen displayed is a BOX screen for selecting one data as a process target from among one or more data stored in a data storage portion at a point of time when the notice is received, the the data selected in the BOX screen as the process target at the point of time when the notice is received is decided as related data, and transmit the decided related data to the portable information device, the processor of the portable information device is further configured to:

receive the related data from the image forming apparatus in response to the notice; and store the received related data in a data storage.

5. The image forming system according to claim 4, the portable information device further comprising an image storage portion to store an image obtained by the image shooting portion shooting an image of an operation screen of the image forming apparatus, an association portion to associate the related data received from the image forming apparatus with the stored image, an image display control portion to display the image stored by the image storage portion, and a remote operation portion to, in response to the image displayed by the image display control portion being designated, transmit a remote operation command including the related data associated with the designated image to the image forming apparatus, the image forming apparatus further comprising a remote control portion to execute a process based on the related data included in the remote operation command, in accordance with the remote operation command received from the portable information device.

6. An image forming system configured with an image forming apparatus and a portable information device capable of communicating with the image forming apparatus, the portable information device comprising:

a shooting portion to shoot an image of a subject; and a processor configured to give a notice that an image is shot to the image forming apparatus, in response to an image of an operation screen of the image forming apparatus being shot, the image forming apparatus comprising:

a display to display an operation screen; and a processor configured to in response to the notice being received from the portable information device, decide related data that is related to the operation screen displayed at a point of time when the notice is received, from among data held by the image forming apparatus at that point of time wherein if the operation screen displayed at a point of time when the notice is received is a preview screen for displaying an image of data comprised of a plurality of pages, the data comprised of a plurality of pages and page identification information for identifying a page corresponding to an image displayed in the preview screen among a plurality of pages included in the data is decided as the related data, and transmit the decided related data to the portable information device, the processor of the portable information device is further configured to:

receive the related data from the image forming apparatus in response to the notice;

store the received related data in a data storage; and display an image of a page specified by the page identification information among a plurality of pages included in the data in response to the related data being received from the image forming apparatus.

7. The image forming system according to claim 6, the portable information device further comprising an image storage portion to store an image obtained by the image shooting portion shooting an image of an operation screen of the image forming apparatus, an association portion to associate the related data received from the image forming apparatus with the stored image, an image display control portion to display the image stored by the image storage portion, and a remote operation portion to, in response to the image displayed by the image display control portion being designated, transmit a remote operation command including the related data associated with the designated image to the image forming apparatus, the image forming apparatus further comprising a remote control portion to execute a process based on the related data included in the remote operation command, in accordance with the remote operation command received from the portable information device.

8. A cooperation method executed in an image forming system configured with an image forming apparatus and a portable information device capable of communicating with the image forming apparatus, the portable information device including a shooting portion to shoot an image of a subject, the method allowing the portable information device to execute a notice step of giving a notice that an image is shot to the image forming apparatus, in response to an image of an operation screen of the image forming apparatus being shot by the shooting portion, the method allowing the image forming apparatus to execute:

a display control step of displaying an operation screen;

a data decision step of, in response to the notice being received from the portable information device, deciding related data that is related to the operation screen displayed at a point of time when the notice is received, from among data held by the image forming apparatus at that point of time, wherein if the operation screen displayed at a point of time when the notice is received is a history display screen for displaying history of a process executed in the image forming apparatus, a setting value set for the process specified on the history display screen is decided as related data; and a related data transmission step of transmitting the decided related data to the portable information device, the method further allowing the portable information device to execute:

a related data reception step of receiving the related data from the image forming apparatus in response to the notice; and a related data storage step of storing the received related data.

9. The cooperation method according to claim 8, wherein the method further allows the portable information device to execute:

an image storage step of storing an image obtained by the shooting portion shooting an image of an operation screen of the image forming apparatus;

an association step of associating the related data received from the image forming apparatus with the stored data;

an image display control step of displaying the image stored in the image storage step; and a remote operation step of, in response to the image displayed in the image display control step being designated, transmitting, to the image forming apparatus, a remote operation command including the related data associated with the designated image, and the method further allows the image forming apparatus to execute a remote control step of executing a process based on the related data included in the remote operation command, in accordance with the remote operation command received from the portable information device.

10. A cooperation method executed in an image forming system configured with an image forming apparatus and a portable information device capable of communicating with the image forming apparatus,
the portable information device including a shooting portion to shoot an image of a subject,
the method allowing the portable information device to execute
a notice step of giving a notice that an image is shot to the image forming apparatus, in response to an image of an operation screen of the image forming apparatus being shot by the shooting portion,
the method allowing the image forming apparatus to execute:
a display control step of displaying an operation screen;
a data decision step of, in response to the notice being received from the portable information device, deciding related data that is related to the operation screen displayed at a point of time when the notice is received, from among data held by the image forming apparatus at that point of time, wherein if the operation screen displayed is a BOX screen for selecting one data as a process target from among one or more data stored in a data storage portion at a point of time when the notice is received, the data selected in the BOX screen as the process target at the point of time when the notice is received is decided as related data; and
a related data transmission step of transmitting the decided related data to the portable information device,
the method further allowing the portable information device to execute:
a related data reception step of receiving the related data from the image forming apparatus in response to the notice; and
a related data storage step of storing the received related data.

11. The cooperation method according to claim 10, wherein
the method further allows the portable information device to execute:
an image storage step of storing an image obtained by the shooting portion shooting an image of an operation screen of the image forming apparatus;
an association step of associating the related data received from the image forming apparatus with the stored data;
an image display control step of displaying the image stored in the image storage step; and
a remote operation step of, in response to the image displayed in the image display control step being designated, transmitting, to the image forming apparatus, a remote operation command including the related data associated with the designated image, and
the method further allows the image forming apparatus to execute a remote control step of executing a process based on the related data included in the remote operation command, in accordance with the remote operation command received from the portable information device.

12. A cooperation method executed in an image forming system configured with an image forming apparatus and a portable information device capable of communicating with the image forming apparatus,
the portable information device including a shooting portion to shoot an image of a subject,
the method allowing the portable information device to execute
a notice step of giving a notice that an image is shot to the image forming apparatus, in response to an image of an operation screen of the image forming apparatus being shot by the shooting portion,
the method allowing the image forming apparatus to execute:
a display control step of displaying an operation screen;
a data decision step of, in response to the notice being received from the portable information device, deciding related data that is related to the operation screen displayed at a point of time when the notice is received, from among data held by the image forming apparatus at that point of time, wherein if the operation screen displayed at a point of time when the notice is received is a preview screen for displaying an image of data comprised of a plurality of pages, the data comprised of a plurality of pages and page identification information for identifying a page corresponding to an image displayed in the preview screen among a plurality of pages included in the data is decided as the related data; and
a related data transmission step of transmitting the decided related data to the portable information device,
the method further allowing the portable information device to execute:
a related data reception step of receiving the related data from the image forming apparatus in response to the notice;
a related data storage step of storing the received related data; and
a display step of display an image of a page specified by the page identification information among a plurality of pages included in the data in response to the related data being received from the image forming apparatus.

13. The cooperation method according to claim 12, wherein
the method further allows the portable information device to execute:
an image storage step of storing an image obtained by the shooting portion shooting an image of an operation screen of the image forming apparatus;
an association step of associating the related data received from the image forming apparatus with the stored data;
an image display control step of displaying the image stored in the image storage step; and
a remote operation step of, in response to the image displayed in the image display control step being designated, transmitting, to the image forming apparatus, a remote operation command including the related data associated with the designated image, and
the method further allows the image forming apparatus to execute a remote control step of executing a process based on the related data included in the remote operation command, in accordance with the remote operation command received from the portable information device.

* * * * *